United States Patent
Morishima et al.

(10) Patent No.: US 9,598,998 B2
(45) Date of Patent: Mar. 21, 2017

(54) CONTROL APPARATUS FOR INTERNAL COMBUSTION ENGINE

(75) Inventors: Akinori Morishima, Naka-gun (JP); Kenichi Tsujimoto, Mishima (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 68 days.

(21) Appl. No.: 14/369,226

(22) PCT Filed: Jan. 27, 2012

(86) PCT No.: PCT/JP2012/000549
§ 371 (c)(1),
(2), (4) Date: Jun. 27, 2014

(87) PCT Pub. No.: WO2013/111197
PCT Pub. Date: Aug. 1, 2013

(65) Prior Publication Data
US 2015/0007562 A1    Jan. 8, 2015

(51) Int. Cl.
*F02D 23/00*    (2006.01)
*F01N 3/22*    (2006.01)
(Continued)

(52) U.S. Cl.
CPC ............. *F01N 3/225* (2013.01); *B60W 10/06* (2013.01); *B60W 10/115* (2013.01);
(Continued)

(58) Field of Classification Search
CPC ........ F01N 3/225; F01N 3/2033; F01N 3/025; F01N 3/027; F01N 2610/00;
(Continued)

(56) References Cited

U.S. PATENT DOCUMENTS 5,044,158 A * 9/1991 Goerlich ................. F01N 3/025
60/274
5,644,913 A * 7/1997 Iwai ........................ F01N 3/204
60/284
(Continued)

FOREIGN PATENT DOCUMENTS

JP    01-285623 A    11/1989
JP    08-170525 A    7/1996
(Continued)

*Primary Examiner* — Nicholas J Weiss
*Assistant Examiner* — Jason T Newton
(74) *Attorney, Agent, or Firm* — Andrews Kurth Kenyon LLP

(57) ABSTRACT

A control apparatus for an internal combustion engine according to the invention is applied to an internal combustion engine that is equipped with an exhaust gas treatment device that is provided in an exhaust passage, and a burner device that is provided in the exhaust passage upstream of the exhaust gas treatment device so as to raise a temperature of exhaust gas supplied to the exhaust gas treatment device. The control apparatus performs an increase control for increasing a concentration of oxygen in exhaust gas supplied to the burner device if the concentration of oxygen is not higher than a predetermined required concentration of oxygen when there is a request to operate the burner device. The combustion performance of the burner device is stably ensured by securing or compensating for an insufficient concentration of oxygen.

12 Claims, 14 Drawing Sheets

(51) Int. Cl.
*F01N 3/20* (2006.01)
*F02D 41/00* (2006.01)
*F02D 41/02* (2006.01)
*B60W 10/06* (2006.01)
*B60W 10/115* (2012.01)
*F02D 17/02* (2006.01)
*F02D 41/22* (2006.01)
*F02D 29/06* (2006.01)
*F01N 3/08* (2006.01)
*F01N 3/10* (2006.01)
*F01N 9/00* (2006.01)
*F02B 37/24* (2006.01)
*F02D 9/06* (2006.01)
*F02D 41/12* (2006.01)

(52) U.S. Cl.
CPC ........... *F01N 3/2033* (2013.01); *F02D 17/02* (2013.01); *F02D 29/06* (2013.01); *F02D 41/0007* (2013.01); *F02D 41/0055* (2013.01); *F02D 41/0087* (2013.01); *F02D 41/021* (2013.01); *F02D 41/025* (2013.01); *F02D 41/22* (2013.01); F01N 3/0842 (2013.01); F01N 3/0871 (2013.01); F01N 3/106 (2013.01); F01N 9/00 (2013.01); F01N 2240/14 (2013.01); F01N 2270/04 (2013.01); F01N 2430/00 (2013.01); F01N 2430/02 (2013.01); F01N 2430/06 (2013.01); F02B 37/24 (2013.01); F02D 9/06 (2013.01); F02D 41/12 (2013.01); F02D 41/123 (2013.01); F02D 2041/026 (2013.01); F02D 2250/24 (2013.01); F02D 2250/32 (2013.01); F02M 26/05 (2016.02); Y02T 10/144 (2013.01); Y02T 10/26 (2013.01); Y02T 10/47 (2013.01)

(58) Field of Classification Search
CPC ...... F01N 2430/06; F02D 29/06; F02D 41/22; F02D 41/0055; F02D 41/025; F02D 17/02; F02D 41/087; F02D 41/021; F02D 41/0007; F02D 41/1454; B60W 10/06; B60W 10/015

USPC .......................................... 60/602, 286, 303
See application file for complete search history.

(56) References Cited

U.S. PATENT DOCUMENTS

| | | | | |
|---|---|---|---|---|
| 8,245,671 | B2* | 8/2012 | Leone | F02D 41/0027 123/3 |
| 8,347,606 | B2* | 1/2013 | Sakimoto | B01F 3/04049 60/285 |
| 9,027,327 | B2* | 5/2015 | Johnson | F01N 9/00 60/295 |
| 2005/0172617 | A1* | 8/2005 | Persson | F01N 3/023 60/286 |
| 2007/0220867 | A1* | 9/2007 | Clerc | F01N 3/025 60/288 |
| 2008/0295485 | A1* | 12/2008 | Wiley | F01L 13/065 60/274 |
| 2010/0011747 | A1* | 1/2010 | Kapparos | F01N 3/0256 60/286 |
| 2010/0101409 | A1* | 4/2010 | Bromberg | F01N 3/025 95/8 |
| 2010/0139267 | A1* | 6/2010 | Schliesche | F02M 25/0709 60/602 |
| 2010/0313551 | A1* | 12/2010 | Johnson | F01N 3/023 60/286 |
| 2011/0146248 | A1* | 6/2011 | Charles | F01N 3/0256 60/295 |
| 2012/0216509 | A1* | 8/2012 | Sujan | F02D 41/029 60/274 |
| 2015/0300277 | A1* | 10/2015 | Stenl S | F02D 41/1444 701/110 |
| 2015/0330277 | A1* | 11/2015 | Dickson | F01N 3/2006 60/274 |

FOREIGN PATENT DOCUMENTS

| | | |
|---|---|---|
| JP | 2006-112401 A | 4/2006 |
| JP | 2010-249016 A | 11/2010 |
| JP | 2011-247208 A | 12/2011 |

* cited by examiner

US 9,598,998 B2

CONTROL APPARATUS FOR INTERNAL COMBUSTION ENGINE

CROSS-REFERENCE TO RELATED APPLICATIONS

This is a national phase application based on the PCT International Patent Application No. PCT/JP2012/000549 filed Jan. 27, 2012, the entire contents of which are incorporated herein by reference.

TECHNICAL FIELD

The invention relates to a control apparatus for an internal combustion engine, and more particularly, to a control apparatus for an internal combustion engine having a burner device provided in an exhaust passage upstream of an exhaust gas treatment device.

BACKGROUND ART

In an exhaust passage for an internal combustion engine of a vehicle or the like, in some cases, a burner device is provided upstream of an exhaust gas treatment device (a catalyst or the like), the temperature of exhaust gas is raised through the use of heated gas generated by the burner device, and the exhaust gas treatment device is heated to promote warm-up thereof. Typically, the burner device ignites and burns the fuel added into the exhaust passage, thereby generating heated gas including flames (e.g., see Patent Document 1).

By the way, in the burner device, the obtained combustion performance is enhanced as the concentration of oxygen in exhaust gas supplied to the burner device rises. On the contrary, if an attempt is made to obtain combustion performance of at least a certain level in the burner device, the concentration of oxygen in supplied gas needs to be higher than a minimum required concentration of oxygen. This tendency is remarkable especially when the temperature of supplied gas is low.

On the other hand, in recent years, improvements in fuel economy have been made by holding the engine rotational speed low, and the amount of exhaust gas per unit time tends to fall. Meanwhile, the decrease in friction resulting from a decrease in engine rotational speed is small, and there is also a drag resistance of a torque converter in the case of an automatic transmission car. Therefore, the engine load has been higher than before.

In such circumstances, the concentration of oxygen in exhaust gas or hence the concentration of oxygen in gas supplied to the burner device tends to decrease. It has been difficult to stably ensure combustion performance of at least a certain level especially when the temperature of exhaust gas is low.

It is thus an object of the invention to provide a control apparatus for an internal combustion engine that can stably ensure combustion performance of at least a certain level in a burner device.

RELATED ART DOCUMENT

Patent Document

Patent Document 1: Japanese Patent Application Publication No. 2006-112401 (JP-2006-112401 A)

SUMMARY OF THE INVENTION

According to one aspect of the invention, there is provided a control apparatus for an internal combustion engine. The internal combustion engine is equipped with an exhaust gas treatment device that is provided in an exhaust passage, and a burner device that is provided in the exhaust passage upstream of the exhaust gas treatment device so as to raise a temperature of exhaust gas supplied to the exhaust gas treatment device. The control apparatus for the internal combustion engine is characterized in that an increase control for increasing a concentration of oxygen in exhaust gas supplied to the burner device is performed if the concentration of oxygen in exhaust gas supplied to the burner device is not higher than a predetermined required concentration of oxygen when there is a request to operate the burner device.

Preferably, the increase control includes a first control for restricting operation of an auxiliary that is driven by the internal combustion engine.

Preferably, the first control includes stopping the auxiliary.

Preferably, the internal combustion engine is equipped with a turbocharger that is provided in the exhaust passage upstream of the burner device, the turbocharger has a variable vane that is provided at an inlet portion of a turbine, and the increase control includes a second control for changing an opening degree of the variable vane.

Preferably, the second control includes reducing the opening degree of the variable vane if an operating state of the internal combustion engine is within a predetermined non-supercharge region and an engine rotational speed is equal to or lower than a predetermined rotational speed.

Preferably, the second control includes reducing the opening degree of the variable vane within such a range that an intake pressure does not exceed an atmospheric pressure.

Preferably, the second control includes increasing the opening degree of the variable vane if an operating state of the internal combustion engine is within a predetermined non-supercharge region and an engine rotational speed is higher than a predetermined rotational speed.

Preferably, the internal combustion engine is mounted on a vehicle, the vehicle has an automatic transmission that is coupled to the internal combustion engine via a torque converter, and the increase control includes a third control for increasing/reducing an engine rotational speed by increasing/reducing an amount of fuel supplied into a cylinder during deceleration of the vehicle.

Preferably, the internal combustion engine is mounted on a vehicle, the vehicle has an automatic transmission that is coupled to the internal combustion engine via a torque converter, and the increase control includes a fourth control for downshifting the automatic transmission at a timing earlier than a prescribed shift schedule during deceleration of the vehicle.

Preferably, the internal combustion engine is equipped with a first stoppable cylinder group, a second stoppable cylinder group, and the exhaust gas treatment device and the burner device that are provided individually for each of the cylinder groups, the control apparatus determines, for each of the cylinder groups, whether or not there is a request to operate the burner device and whether or not the concentration of oxygen in exhaust gas supplied to the burner device is higher than the required concentration of oxygen, and the increase control includes a fifth control for stopping one of the cylinder groups as to which it is determined that the concentration of oxygen in exhaust gas supplied to the burner device is not higher than the required concentration of oxygen.

Preferably, the control apparatus can carry out a diagnosis of a malfunction in the burner device, and stops the auxiliary that is driven by the internal combustion engine, at a time of the diagnosis of the malfunction.

Preferably, the control apparatus increases an opening degree of a throttle valve that is provided in an intake passage, before performing the increase control, if it is determined that the concentration of oxygen in exhaust gas supplied to the burner device is not higher than the required concentration of oxygen, and performs the increase control if the concentration of oxygen in exhaust gas supplied to the burner device is not higher than the required concentration of oxygen even when the opening degree of the throttle valve is increased to a maximum opening degree.

The invention exerts an excellent effect of making it possible to stably ensure at least a certain level of combustion performance in the burner device.

MODE FOR CARRYING OUT THE INVENTION

A preferred embodiment of the invention will be described hereinafter in detail. It should be noted, however, that the mode for carrying out the invention is not limited to each of the following modes, and that the invention encompasses all modification examples and application examples that are included in the concept of the invention prescribed by the claims. The dimensions, materials, shapes, relative arrangement, and the like of components mentioned in the embodiment of the invention are not intended to exclusively limit the technical scope of the invention thereto, unless otherwise specified.

In the following description, the upstream side will be referred to also as "front", and the downstream side will be referred to also as "rear".

Figure 1:
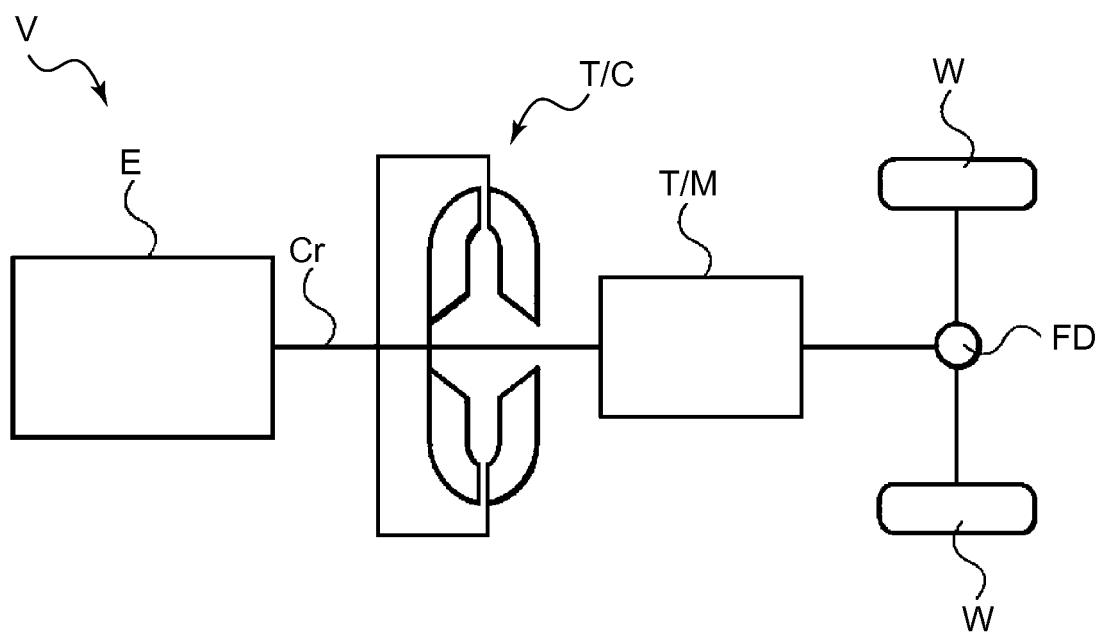
FIG. 1 is a schematic view showing a drive system of a vehicle according to the present embodiment of the invention.

FIG. 1 schematically shows a drive system of a vehicle according to the present embodiment of the invention. A vehicle (an automobile) V according to the present embodiment of the invention is an automatic transmission car. An automatic transmission T/M that can be shifted in multiple stages is coupled to a crankshaft Cr of an internal combustion engine (an engine) E that is mounted on the vehicle V, via a torque converter T/C. A pair of right and left wheels W are coupled to an output shaft of the automatic transmission T/M via a final reduction gear FD that includes a differential mechanism.

Figure 2:
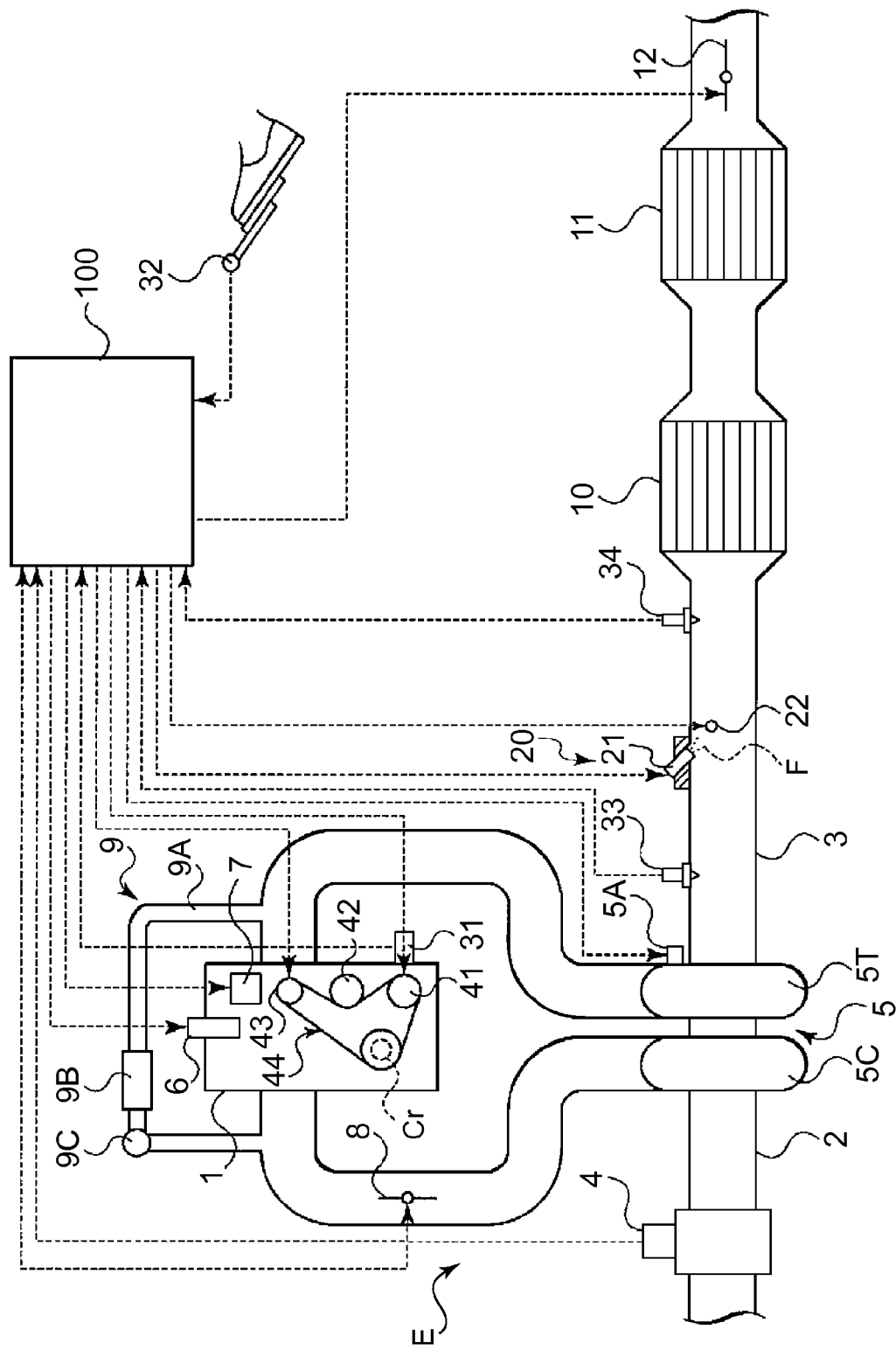
FIG. 2 is a schematic view of an internal combustion engine according to the present embodiment of the invention.

FIG. 2 shows a schematic configuration of the engine E. The engine E according to the present embodiment of the invention is a multi-cylinder compression ignition internal combustion engine, namely, a diesel engine. An intake passage 2 and an exhaust passage 3 are connected to an engine body 1 that includes a cylinder block, a cylinder head, a piston, and the like. The intake passage 2 is provided, at an upstream portion thereof, with an airflow meter 4. This airflow meter 4 detects an amount of intake air per unit time.

The engine body 1 has a plurality of cylinders (not shown), and each of the cylinders is provided with a fuel injection valve that directly injects fuel into the cylinder, namely, an in-cylinder injection valve 6. Besides, each of the cylinders is provided with an intake valve and an exhaust valve.

The engine body 1 is provided with a variable valve timing mechanism 7 for changing the valve timings of the exhaust valves. The variable valve timing mechanism 7 is a mechanism that simultaneously and steplessly changes the timings for opening/closing the exhaust valves of all the cylinders while keeping the working angles of the exhaust valves of all the cylinders constant.

The exhaust passage 3 is provided, except at its ends thereof, with a variable capacity-type turbocharger 5. The turbocharger 5 has a turbine 5T that is driven by exhaust gas, and a compressor 5C that is driven by the turbine 5T to raise the intake pressure. A plurality of variable vanes (not shown) for making variable the flow rate of exhaust gas flowing into the turbine 5T, and a vane actuator 5A for simultaneously opening/closing these variable vanes are provided at an inlet portion of the turbine 5T. An electronically controlled throttle valve 8 is provided in the intake passage 2 downstream of the compressor 5C.

The engine E is also provided with an EGR device 9. The EGR device 9 is designed to carry out EGR (external EGR) for recirculating exhaust gas in the exhaust passage 3 into the intake passage 2. The EGR device 9 is equipped with an EGR passage 9A that links the exhaust passage 3 and the intake passage 2 with each other, and an EGR cooler 9B and an EGR valve 9C that are provided in the EGR passage 9A in this order from the upstream side.

An oxidation catalyst 10 and an NOx catalyst 11, which constitute exhaust gas treatment devices respectively, are installed in series in this order from the upstream side, in the exhaust passage 3 downstream of the turbine 5T. An outlet portion of the exhaust passage 3 further downstream of the NOx catalyst 11 is open to the atmosphere via a muffler (not shown).

The oxidation catalyst 10 causes unburned components such as HC, CO and the like to react with oxygen $O_2$, and turns them into CO, $CO_2$, $H_2O$ and the like. As a catalyst substance, for example, $Pt/CeO_2$, $Mn/CeO_2$, $Fe/CeO_2$, $Ni/CeO_2$, $Cu/CeO_2$ or the like can be employed.

The NOx catalyst 11 is configured as, for example, an occlusion/reduction-type NOx catalyst (NSR: NOx Storage Reduction). The NOx catalyst 11 has the functions of occluding NOx in exhaust gas if the air-fuel ratio of exhaust gas flowing into the NOx catalyst 11 is higher than the stoichiometric air-fuel ratio (the theoretical air-fuel ratio, e.g. 14.6), and discharging and reducing the occluded NOx if the air-fuel ratio of exhaust gas is equal to or lower than the stoichiometric air-fuel ratio. The NOx catalyst 11 is configured by having a noble metal such as platinum Pt as a catalyst component and an NOx absorbent component supported on the surface of a substrate that is made of an oxide such as alumina $Al_2O_3$ or the like. The NOx absorbent component is made of, for example, at least one material selected from alkali metals such as potassium K, sodium Na, lithium Li and cesium Cs, alkaline earths such as barium Ba and calcium Ca, and rare earths such as lanthanum La and yttrium Y. Incidentally, the NOx catalyst 11 may be a selective reduction-type NOx catalyst (SCR: Selective Catalytic Reduction) that can continuously perform the treatment of reducing NOx in exhaust gas when a reducing agent such as urea or the like is supplied.

In addition to this oxidation catalyst 10 and this NOx catalyst 11, a particulate filter (a DPF) that collects particulates (PM) such as soot and the like in exhaust gas may be provided. Preferably, the DPF has a catalyst made of a noble metal supported thereon, and is designed as a continuous reproduction type in which the collected particulates are continuously oxidized and burned. Preferably, the DPF is arranged at least downstream of the oxidation catalyst 10. Incidentally, the engine may be a spark ignition internal combustion engine, namely, a gasoline engine. In this case, it is preferable that a three-way catalyst be provided in the exhaust passage. This DPF and this three-way catalyst also fall under the category of exhaust gas treatment devices.

An exhaust shutter 12 mainly for exhaust brake is provided in the exhaust passage 3 downstream of the NOx catalyst 11.

A burner device 20 is installed in the exhaust passage 3 downstream of the turbine 5T and upstream of the oxidation catalyst 6. The burner device 20 is designed to raise the temperature of exhaust gas supplied to the oxidation catalyst 10 and the NOx catalyst 11 (especially the oxidation catalyst 10 that is located at the most upstream position), which are located downstream of the burner device 20. The burner device 20 includes a fuel addition valve 21, and a heater or a glow plug 22 as an ignition device.

The fuel addition valve 21 injects, supplies or adds a liquid fuel F into the exhaust passage 3. As the fuel F, diesel oil as a fuel for engines is used in common, but another kind of fuel may be used. The fuel addition valve 21 injects the fuel F substantially towards the glow plug 22. The glow plug 22 ignites or burns the fuel F injected from the fuel addition valve 21, or the mixture of this fuel and exhaust gas. The glow plug 22 is arranged at a position downstream of the fuel addition valve 21.

The burner device 20 may include a small-size oxidation catalyst (not shown) that is installed in the exhaust passage 3 at a position immediately behind the glow plug 22.

The engine E is comprehensively controlled by an electronic control unit (hereinafter referred to as an ECU) 100 that is mounted on the vehicle. The ECU 100 is configured to be equipped with a CPU that performs various calculation processes regarding engine control, a ROM that stores programs and data needed for the control, a RAM that temporarily stores a calculation result and the like of the CPU, an input/output port for inputting/outputting signals from/to the outside, and the like.

In addition to the aforementioned airflow meter 4, a crank angle sensor 31 for detecting a crank angle of the engine, and an accelerator opening degree sensor 32 for detecting an accelerator opening degree are connected to the ECU 100.

The ECU 100 calculates an engine rotational speed Ne on the basis of an output of the crank angle sensor 31. Besides, the ECU 100 calculates an intake air amount Ga on the basis of an output of the airflow meter 4. Then, the ECU 100 calculates an engine load on the basis of the calculated intake air amount Ga.

An upstream exhaust gas temperature sensor 33 is provided in the exhaust passage 3 at a position downstream of the turbine 5T and upstream of the burner device 20, and a downstream exhaust gas temperature sensor 34 is provided in the exhaust passage 3 at a position downstream of the burner device 20 and upstream of the oxidation catalyst 10. These exhaust gas temperature sensors 33 and 34 are also connected to the ECU 100.

The ECU 100 controls the aforementioned in-cylinder injection valves 6, the aforementioned throttle valve 8, the aforementioned vane actuator 5A, the aforementioned variable valve timing mechanism 7, the aforementioned EGR valve 9C, the aforementioned exhaust shutter 12, and the aforementioned burner device 20 (the fuel addition valve 21 and the glow plug 22).

In addition, the engine body 1 is fitted with a plurality of auxiliaries that are driven by the crankshaft Cr. That is, the engine body 1 is fitted with an air-conditioning (A/C) compressor 41, a water pump 42, and an alternator 43, which serve as auxiliaries respectively. These respective auxiliaries are coupled to the crankshaft Cr via a pulley/belt mechanism 44, and is rotationally driven by the crankshaft Cr. Among these auxiliaries, the operation states of the A/C compressor 41 and the alternator 43 are controlled by the ECU 100.

It should be noted that the burner device 20 according to the present embodiment of the invention is used or operated to activate the oxidation catalyst 10 located at the most upstream position as soon as possible, mainly during warm-up of the engine after cold start thereof. On the other hand, if the temperature of the oxidation catalyst 10 becomes lower than a minimum activation temperature to deactivate the oxidation catalyst 10 even when the engine is not being warmed up, the burner device 20 is operated to activate this oxidation catalyst.

When the burner device 20 is operated, the fuel addition valve 21 and the glow plug 22 are turned on, and the fuel F added from the fuel addition valve 21 or the mixture of this fuel F and exhaust gas is ignited and burned by the glow plug 22. Thus, heated gas containing flames is generated, and the temperature of exhaust gas is raised by this heated gas. The exhaust gas whose temperature has been raised is supplied to the oxidation catalyst 10, and promotes activation of the oxidation catalyst 10. The burner device 20 can be stopped as soon as the oxidation catalyst 6 is activated.

Incidentally, in the case where the burner device 20 is provided with a small-size oxidation catalyst, the small-size oxidation catalyst is supplied with the added fuel F and generates heat, thereby contributing towards raising the temperature of exhaust gas. Besides, the small-size oxidation catalyst also has the functions of reforming the added fuel F, and sending this reformed added fuel to the oxidation catalyst 10 to provide assistance in activation of the oxidation catalyst 10.

By the way, as described above, in the burner device 20, the obtained combustion performance is enhanced as the concentration of oxygen (referred to also as the O2 concentration) in exhaust gas supplied to this burner device 20 (referred to also as burner inlet gas) rises. On the contrary, in the case where an attempt is made to obtain at least a certain level of combustion performance in the burner device 20, the concentration of oxygen in burner inlet gas needs to be higher than a minimum required concentration of oxygen. In particular, this tendency is remarkable when the temperature of burner inlet gas is low.

It should be noted herein that since the added fuel or the mixture thereof is ignited by the glow plug 22, burner inlet gas can be regarded as exhaust gas that is supplied to a heat generation portion of the glow plug 22.

On the other hand, in recent years, improvements in fuel economy have been made through restriction of the engine rotational speed, so that the amount of exhaust gas per unit time (i.e., the flow rate of exhaust gas) tends to decrease. Meanwhile, the decrease in friction resulting from a decrease in engine rotational speed is small, and there is also a drag resistance of the torque converter T/C in the automatic transmission car as in the present embodiment of the invention, so that the engine load has been higher than before.

When the engine load is enhanced, the amount of fuel supplied into the cylinder, more specifically, the amount of fuel injected from the in-cylinder injection valve 6 (hereinafter referred to as an in-cylinder injection amount) increases, and the air-fuel ratio of exhaust gas is enriched. Accordingly, in such circumstances, the concentration of oxygen in exhaust gas or hence the concentration of oxygen in burner inlet gas tends to decrease, and it has been difficult to stably ensure at least a certain level of combustion performance especially when the temperature of exhaust gas is low.

Figure 3:
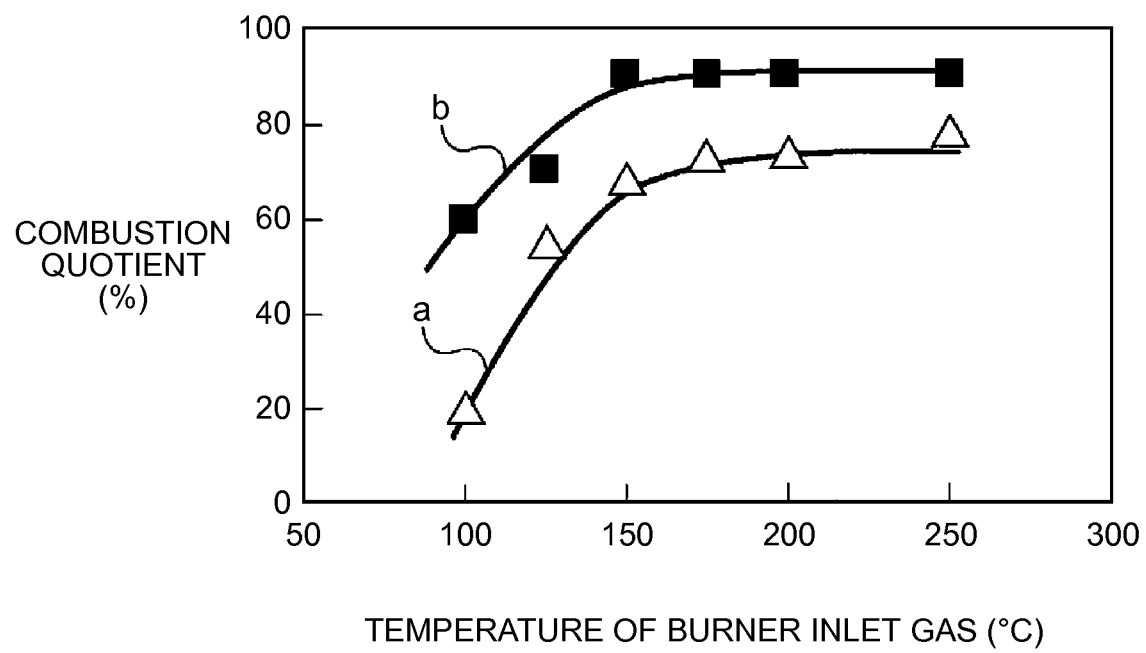
FIG. 3 is a graph showing a relationship between the temperature of inlet gas and the combustion quotient in a burner device.

This point will be described hereinafter in more detail. FIG. 3 shows a test result representing a relationship between the temperature of inlet gas and the combustion quotient in the burner device 20. The combustion quotient (%) mentioned herein means a ratio of the amount of $CO_2$ generated during actual combustion of the added fuel to the amount of $CO_2$ that is generated when the entire added fuel is assumed to have burned completely.

In the drawing, a line a indicates a relationship at the time when the concentration of O2 in burner inlet gas is 16%, and a line b indicates a relationship at the time when the concentration of O2 in burner inlet gas is higher, namely, 18%. As is apparent from these relationships, at the same gas temperature, the combustion quotient rises and the combustion performance of the burner device 20 is enhanced as the concentration of O2 rises.

Besides, in a region where the temperature of gas is low, namely, equal to or lower than 150° C., the combustion quotient falls as the temperature of gas falls. On the other hand, as for the combustion performance of the burner device 20, it is ideal to ensure a combustion quotient equal to or higher than, for example, 60(%). In this case, the temperature of gas needs to be equal to or higher than about 140° C. if the concentration of O2 in burner inlet gas is 16%, and the temperature of gas needs to be equal to or higher than about 100° C. if the concentration of O2 in burner inlet gas is 18%.

Figure 4:
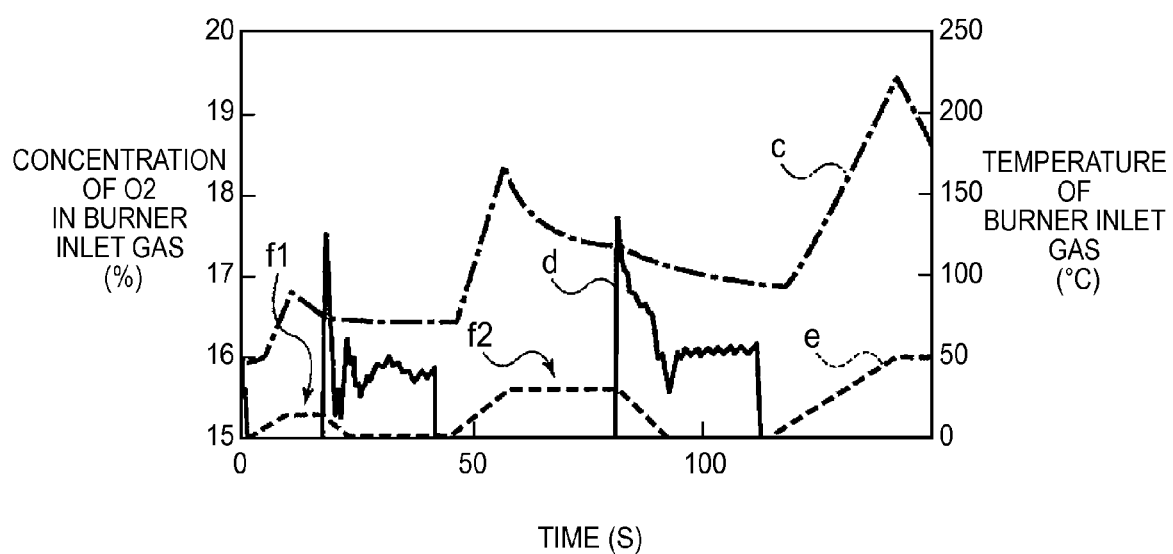
FIG. 4 is a time chart showing a test result in the case where the vehicle is cold-started and caused to travel in an EC mode.

FIG. 4 shows a test result in the case where the vehicle is cold-started and caused to travel in an EC mode. At a time point 0 (s), the engine is started, or the mode is started. The example shown in the drawing represents a certain period after the start of the engine. A line c indicates the temperature of burner inlet gas, a line d indicates the concentration of O2 in burner inlet gas, and a line e indicates the vehicle speed.

If an attempt is made to obtain at least a certain level of combustion performance when the burner device 20 is in operation, the concentration of O2 in burner inlet gas needs to be at lowest 15%. On the other hand, according to the result shown in the drawing, in an idle period after a first peak f1 of the mode and an idle period after a second peak f2 of the mode, the concentration of O2 in burner inlet gas can be ensured of a value of only about 15 to 16% when the temperature of burner inlet gas is low, namely, around 100° C., and the situation is tight.

Moreover, if disadvantageous conditions such as an increase in the frequency of use of the auxiliaries, an increase in friction resulting from a lower temperature condition, an increase in friction immediately after the shipment of the vehicle and the like accumulate, the load applied to the engine increases, the air-fuel ratio of exhaust gas is further enriched, and it may become impossible to ensure a required concentration of O2 in burner inlet gas.

Thus, in the present embodiment of the invention, with a view to solving this problem, an increase control for increasing the concentration of O2 in burner inlet gas when this concentration is insufficient can be performed. More specifically, the control apparatus for the internal combustion engine according to the present embodiment of the invention performs the increase control for increasing the concentration of O2 in burner inlet gas if the concentration of O2 in burner inlet gas is not higher than a predetermined required concentration of oxygen when there is a request to operate the burner device 20.

Thus, it becomes possible to ensure or compensate for the concentration of O2 in burner inlet gas that is insufficient with respect to the required concentration of oxygen, and stably ensure at least a certain level of combustion performance in the burner device.

More specifically, the increase control includes at least one of first to fifth controls that will be described later. In the case where the increase control is performed, one of the first to fifth controls may be selectively performed, or two or more of the first to fifth controls may be performed in combination. Alternatively, two or more of the first to fifth controls may be performed with priority levels assigned thereto.

It should be noted herein that "the increase control" mentioned in the present application does not include the control of increasing the amount of intake air through at least one of an increase in the opening degree of the throttle valve 8 and a reduction in the opening degree of the EGR valve 9C and thus increasing the concentration of O2 in burner inlet gas. Besides, as a matter of course, "the increase control" mentioned in the present application does not include the control of directly introducing oxygen (secondary air) into the exhaust passage.

Figure 5:
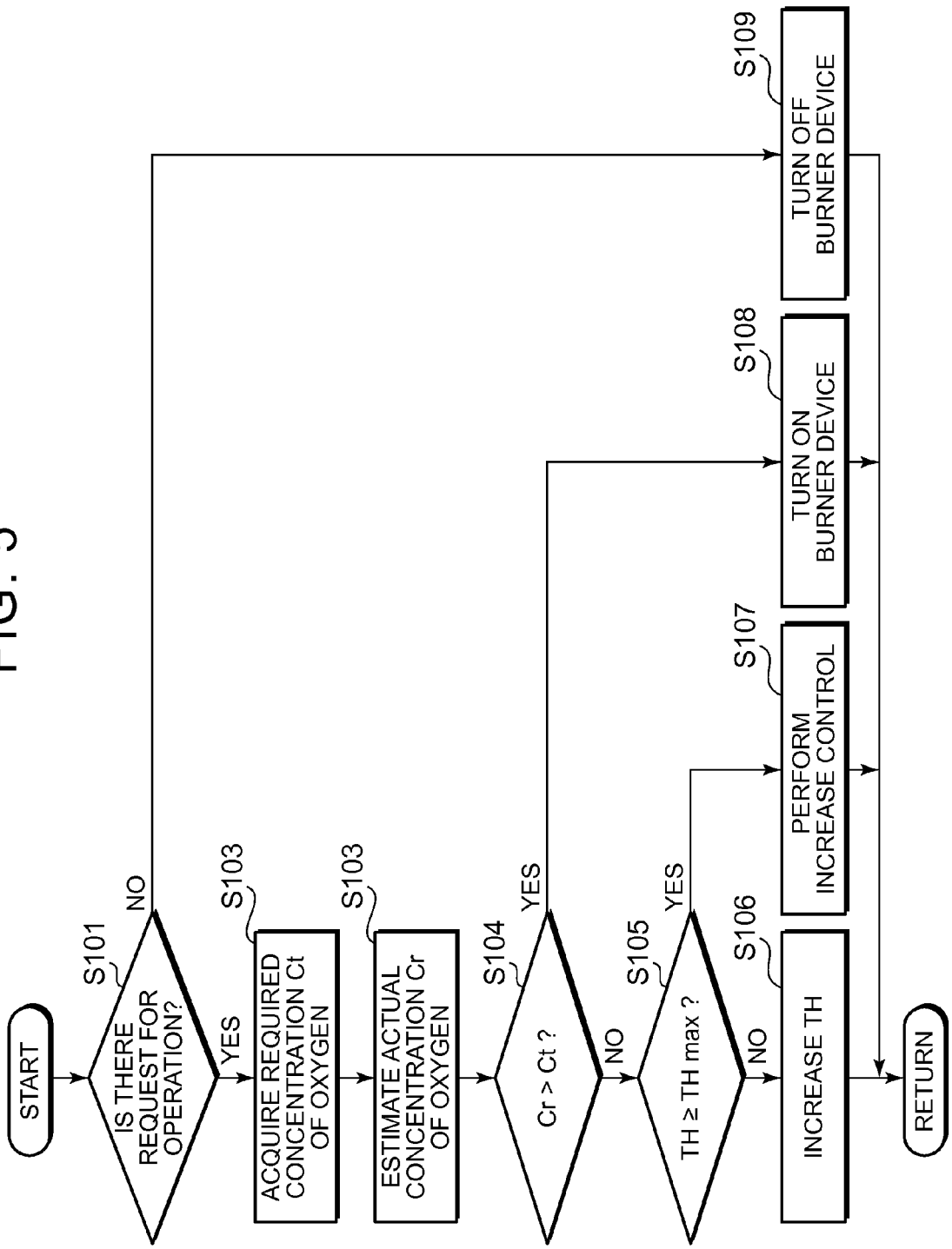
FIG. 5 is a flowchart of a routine regarding the control of the burner device.

FIG. 5 shows a flowchart of a routine regarding the control of the burner device. This routine is repeatedly executed by the ECU 100 on a predetermined calculation cycle.

In step S101, it is determined whether or not there is a request to operate the burner device 20. That is, the ECU 100 compares a catalyst temperature of the oxidation catalyst 10, which is separately acquired through detection or estimation, with a predetermined minimum activation temperature, and determines that there is a request for operation if the catalyst temperature is lower than the minimum activation temperature, and determines that there is no request for operation if the catalyst temperature is equal to or higher than the minimum activation temperature. Incidentally, the burner device 20 is operated to warm up and activate the inactive oxidation catalyst 10. Therefore, a request to operate the burner device 20 can also be paraphrased as a request to warm up the oxidation catalyst 10.

The catalyst temperature of the oxidation catalyst 10 may be directly detected by a temperature sensor that is provided on the oxidation catalyst 10. In the present embodiment of the invention, however, the catalyst temperature of the oxidation catalyst 10 is estimated on the basis of a temperature detected by the downstream exhaust gas temperature sensor 34, an engine operating state, and the like.

If it is determined in step S101 that there is no request for operation, a transition to step S109 is made to stop operation of (turn off) the burner device 20. On the other hand, if it is determined in step S101 that there is a request for operation, the burner device 20 is not immediately operated (turned on), but is operated after the required concentration of O2 in burner inlet gas is ensured via the processes starting from step S102.

In step S102, a predetermined required concentration Ct of oxygen is acquired from a predetermined map (which may be a function, and this will hold true hereinafter), as the minimum required concentration of O2 in burner inlet gas.

Figure 6:
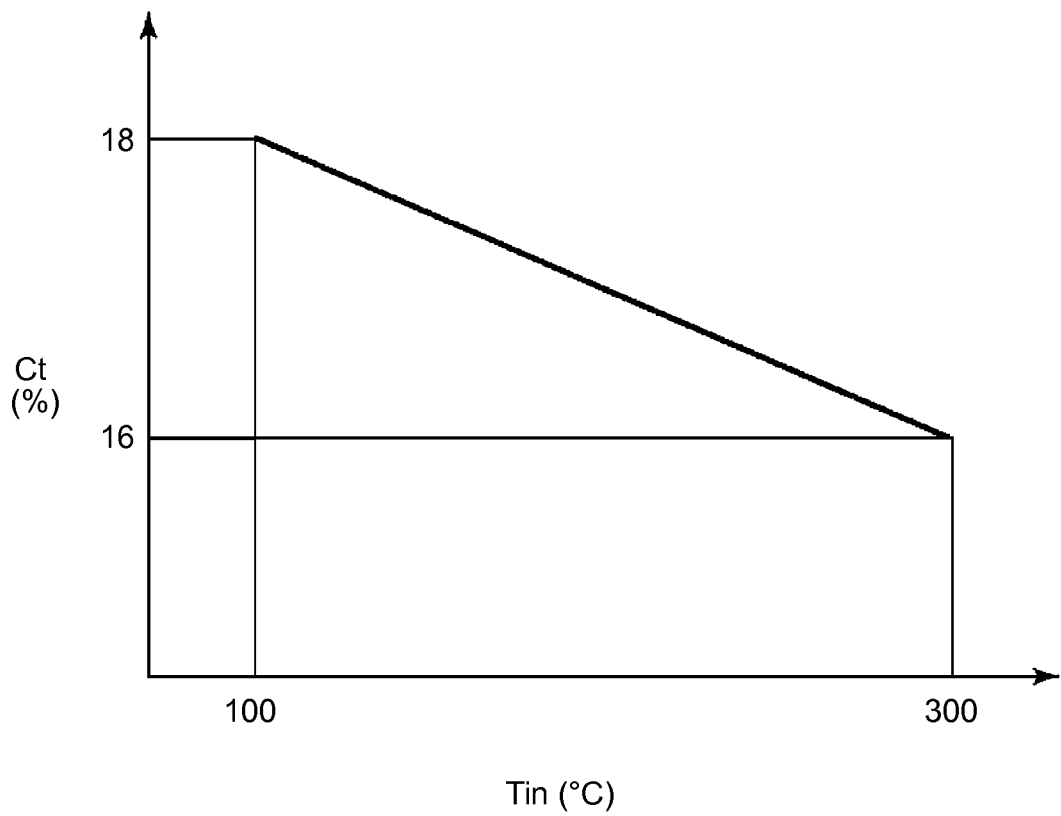
FIG. 6 shows a map for acquiring a required concentration of oxygen.

The required concentration Ct of oxygen is acquired on the basis of a temperature Ti of burner inlet gas, from a map as shown in, for example, FIG. 6. The temperature Ti of burner inlet gas is detected by the upstream exhaust gas temperature sensor 33. As shown in the drawing, the required concentration Ct of oxygen rises as the temperature Ti of burner inlet gas falls. For example, the required concentration Ct of oxygen is 18% when the temperature Ti of burner inlet gas is 100° C., and the required concentration Ct of oxygen is 16% when the temperature Ti of burner inlet gas is 300° C. According to the characteristics of FIG. 3, a sufficient combustion quotient, which is equal to or higher than 60%, can be ensured by thus determining the required concentration Ct of oxygen.

Subsequently in step S103, an actual concentration Cr of oxygen as an actual concentration of oxygen in burner inlet gas is estimated by the ECU 100. This actual concentration Cr of oxygen is estimated according to an expression (1) shown below.

[Expression 1]

$$Cr=(\lambda-1)\cdot(m+n/4)/m+(n/2)+0.79/0.21\cdot\lambda\cdot(m+n/4)+(\lambda-1)\cdot(m+n/4) \quad (1)$$

It should be noted that $\lambda$ denotes an excess air ratio, that m denotes the number of carbon atoms in a fuel molecule, and that n denotes the number of hydrogen atoms in the fuel molecule. For example, the values of m and n are detellnined in advance as 14 and 26 respectively, and stored in the ECU 100.

The excess air ratio $\lambda$ is calculated according to an expression (2) shown below, on the basis of an intake air amount Ga detected by the airflow meter 4 and an in-cylinder injection amount Q.

[Expression 2]

$$\lambda=Ga/Q/14.6 \quad (2)$$

The in-cylinder injection amount Q is calculated according to a predetermined map, on the basis of the engine rotational speed Ne and an accelerator opening degree Ac detected by the accelerator opening degree sensor 32. The in-cylinder injection valves 6 are controlled such that this calculated in-cylinder injection amount Q is actually injected from the in-cylinder injection valves 6.

Incidentally, the actual concentration Cr of oxygen may be directly detected by an oxygen concentration sensor or an air-fuel ratio sensor that is provided in the exhaust passage 3 upstream of the burner device 20.

Subsequently in step S104, the actual concentration Cr of oxygen is compared with the required concentration Ct of oxygen. If it is determined that the actual concentration Cr of oxygen is higher than the required concentration Ct of oxygen, a transition to step S108 is made to operate (turn on) the burner device 20, on the assumption that a minimum required concentration of O2 in burner inlet gas is ensured.

On the other hand, if it is determined that the actual concentration Cr of oxygen is not higher than the required concentration Ct of oxygen, the following steps are executed on the assumption that the minimum required concentration of O2 in burner inlet gas is not ensured.

First of all in step S105, it is determined, on the basis of an output value of a throttle valve opening degree sensor that is installed on the throttle valve 8, whether or not a throttle valve opening degree TH is equal to or larger than a full opening equivalent value THmax.

If the throttle valve opening degree TH is not equal to or larger than the full opening equivalent value THmax, the throttle valve 8 can further be opened. Therefore in step S106, the throttle valve opening degree TH is increased by a predetermined opening degree ΔTH. Thus, the intake air amount Ga increases, and the actual concentration Cr of oxygen increases. The predetermined opening degree ΔTH may be a constant value (e.g., 5°), or a value that can be changed in accordance with the difference between the actual concentration Cr of oxygen and the required concentration Ct of oxygen. In this manner, the throttle valve opening degree TH is feedback-controlled in accordance with the result of the comparison between the actual concentration Cr of oxygen and the required concentration Ct of oxygen.

Incidentally, instead of or in addition to this throttle valve control, the control of reducing the opening degree of the EGR valve 9C may be performed. This is because a reduction in the opening degree of the EGR valve 9C also leads to an increase in the intake air amount Ga and an increase in the actual concentration Cr of oxygen.

On the other hand, if the throttle valve opening degree TH is equal to or larger than the full opening equivalent value THmax, the throttle valve 8 cannot be opened any further. Therefore in step S107, the aforementioned increase control is performed. Thus, the increase control is different from the control of increasing the opening degree of the throttle valve 8 and the control of reducing the opening degree of the EGR valve 9C.

According to this routine, if the actual concentration C of oxygen is not higher than the required concentration Ct of oxygen, the throttle valve opening degree TH is increased first. If the actual concentration Cr of oxygen becomes higher than the required concentration Ct of oxygen only through the increase in the throttle valve opening degree TH, the burner device 20 is turned on at that time point. On the other hand, if the actual concentration Cr of oxygen does not become higher than the required concentration Ct of oxygen even when the throttle valve opening degree TH is increased to the full opening equivalent value THmax, the increase control is performed. If the actual concentration Cr of oxygen becomes higher than the required concentration Ct of oxygen through the increase control, the burner device 20 is turned on at that time point.

As will be understood later, the increase control may include the control the performance of which may be sensed by a user as a fact, such as the alteration of the operation states of the auxiliaries or the like. Consequently, the avoidance of the increase control, if possible, serves to prevent the user from feeling a sense of discomfort. From this point of view, in the present embodiment of the invention, the throttle valve opening degree TH is increased by priority before performing the increase control, and the increase control is performed only if the actual concentration Cr of oxygen in burner inlet gas does not become higher than the required concentration Ct of oxygen even when the throttle valve opening degree TH is increased to the maximum opening degree THmax. Thus, the frequency of the performance of the increase control is reduced, so that the user can be prevented to the utmost from feeling a sense of discomfort.

Nonetheless, this prior throttle valve control can also be omitted. If it is determined that the actual concentration Cr of oxygen is not higher than the required concentration Ct of oxygen (NO in step S104), the increase control (step S107) may be immediately performed.

Next, the first to fifth controls regarding the increase control will be specifically described.

[First Control]

The first control as the increase control is the control of restricting the operation of at least one of the A/C compressor 41 and the alternator 43, which are auxiliaries that are driven by the engine. Preferably, the first control includes stopping at least one of the A/C compressor 41 and the alternator 43. Incidentally, the glow plug installed in each of the cylinders may be included in the auxiliaries.

The ECU 100 controls the amount of a cooling medium discharged from the A/C compressor 41, in accordance with the state of use of an air-conditioner. The load applied to the engine increases as the amount of discharge increases. Restriction of the operation of the A/C compressor 41 means reducing the amount of the cooling medium discharged from the A/C compressor 41, and stoppage of the A/C compressor 41 means making the amount of the cooling medium discharged from the A/C compressor 41 zero. If the A/C compressor 41 is stopped, the load applied to the engine from the A/C compressor 41 substantially vanishes.

Besides, the ECU 100 controls the amount of electric power generated by the alternator 43 in accordance with the charge amount of the battery and the state of use of electric components. The load applied to the engine increases as the amount of generated electric power increases. Restriction of the operation of the alternator 43 means reducing the amount of electric power generated by the alternator 43, and stoppage of the alternator 43 means making the amount of electric power generated by the alternator 43 zero. If the alternator 43 is stopped, the load applied to the engine from the alternator 43 substantially vanishes.

If the operation of the auxiliaries is restricted or stopped, the engine load decreases, and the in-cylinder injection amount Q decreases. Incidentally, if the operation of the auxiliaries is restricted or stopped, the engine load decreases. Therefore, the engine rotational speed rises. In response to this rise in the engine rotational speed, a driver may return an accelerator pedal, the accelerator opening degree Ac may decrease, and the in-cylinder injection amount Q may decrease.

Then, the air-fuel ratio in each of the cylinders is made lean. As a result, the concentration of O2 in exhaust gas or hence burner inlet gas increases. Thus, the insufficient concentration of O2 in burner inlet gas can be ensured or compensated for, and at least a certain level of combustion performance in the burner device can be stably ensured.

Figure 7:
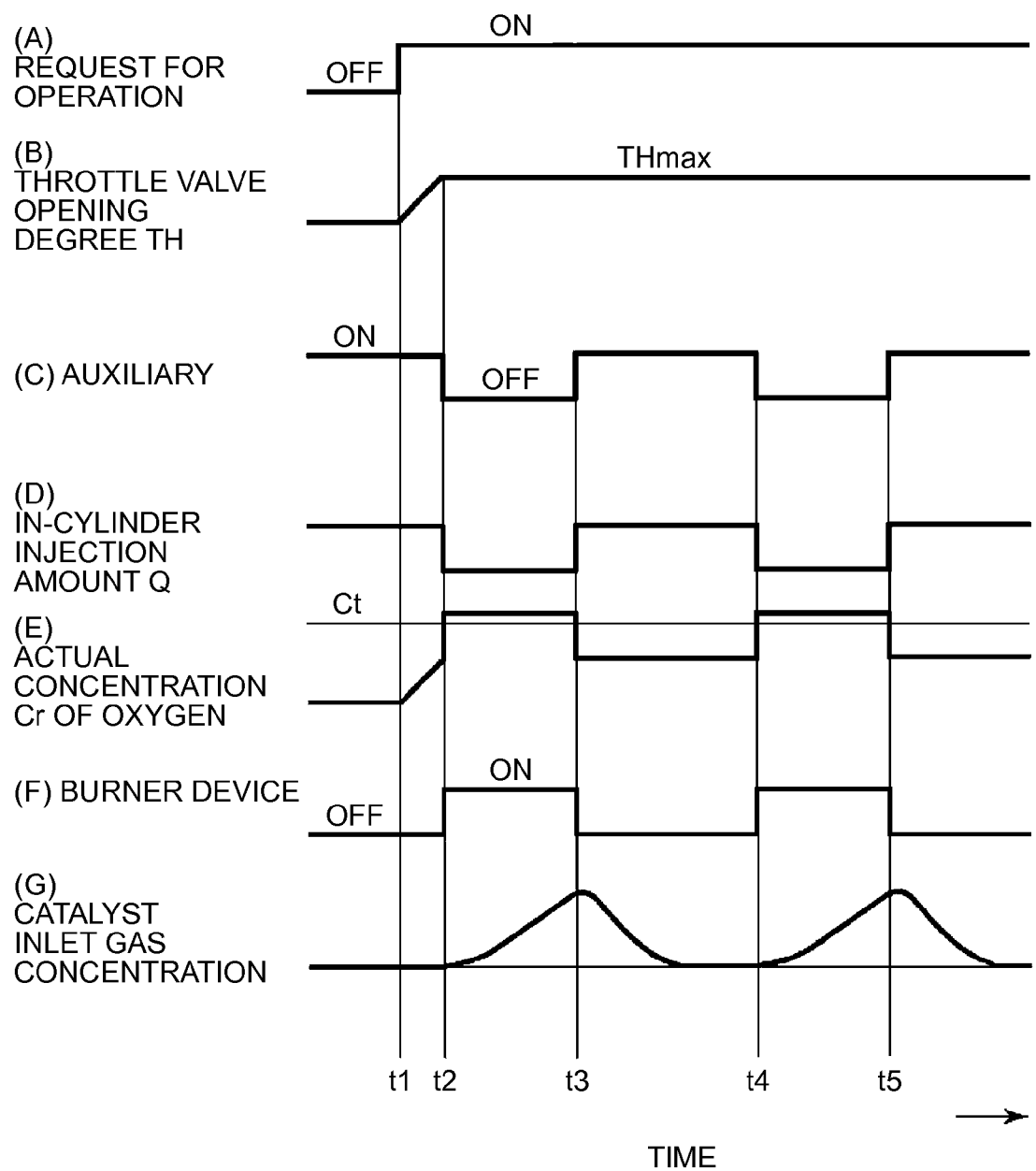
FIG. 7 is a time chart showing an example in the case where a first control is performed as an increase control.

FIG. 7 shows an example at the time when the first control is performed as the increase control of the routine of FIG. 5. It is assumed that a change in state is made from the absence (off) of a request for operation to the presence (on) of a request for operation at a time t1. After that, until a time t2, the actual concentration Cr of oxygen does not become higher than the required concentration Ct of oxygen. Therefore, the throttle valve opening degree TH is gradually increased with the burner device 20 remaining off. The actual concentration Cr of oxygen also gradually increases as the throttle valve opening degree TH increases. The A/C compressor 41 as an auxiliary is in operation, that is, on. This is because the user has turned on the air-conditioner.

The throttle valve opening degree TH has reached the full opening equivalent value THmax at the time t2. Even so, however, the actual concentration Cr of oxygen still does not become higher than the required concentration Ct of oxygen. Therefore, the increase control is performed to stop (make inoperative) the A/C compressor 41, namely, to turn off the A/C compressor 41. Then, the engine load decreases, and the in-cylinder injection amount Q is reduced. Thus, the actual concentration Cr of oxygen becomes higher than the required concentration Ct of oxygen, and the burner device 20 is turned on. In consequence, the temperature of exhaust gas supplied to the oxidation catalyst 10 (which is referred to also as catalyst inlet gas) gradually rises.

At a time t3 after the lapse of a predetermined time period (e.g., about several seconds) from the turning-off of the A/C compressor 41, the A/C compressor 41 is turned on again. That is, the A/C compressor 41 is temporarily stopped. Then, as is the case with the time immediately before the A/C compressor 41 is turned off, the actual concentration Cr of oxygen does not become higher than the required concentration Ct of oxygen. Therefore, the burner device 20 is turned off. Thus, the temperature of catalyst inlet gas gradually falls. Incidentally, the throttle valve opening degree TH is held equal to the full opening equivalent value THmax after having reached the full opening equivalent value THmax.

At a time t4 after the lapse of the predetermined time period from the re-turning-on of the A/C compressor 41, the A/C compressor 41 is turned off again. That is, the A/C compressor 41 is intermittently stopped at intervals of a predetermined time period. Then, in the same manner as described above, the actual concentration C of oxygen becomes higher than the required concentration Ct of oxygen, the burner device 20 is turned on, and the temperature of catalyst inlet gas gradually rises. At a time t5 after the lapse of the predetermined time period, the A/C compressor 41 is turned on again.

By temporarily or intermittently stopping the auxiliary in this manner, it becomes possible to intermittently operate the burner device 20 and raise the temperature of the oxidation catalyst 10 while ensuring the function of the auxiliary to a certain extent instead of completely losing it.

In the description herein, the A/C compressor 41 is the only auxiliary. However, the same holds true for the case where the alternator 43 is the only auxiliary or the case where both the A/C compressor 41 and the alternator 43 are auxiliaries.

Besides, auxiliaries other than the A/C compressor 41 and the alternator 43 may be employed.

[Second Control]

The second control as the increase control is the control of changing the opening degree of the variable vanes of the turbocharger 5. This opening degree is changed by being reduced or increased. The former control is referred to as an opening degree reduction control, and the latter control is referred to as an opening degree increase control. First of all, the opening degree reduction control will be described.

Figure 8:
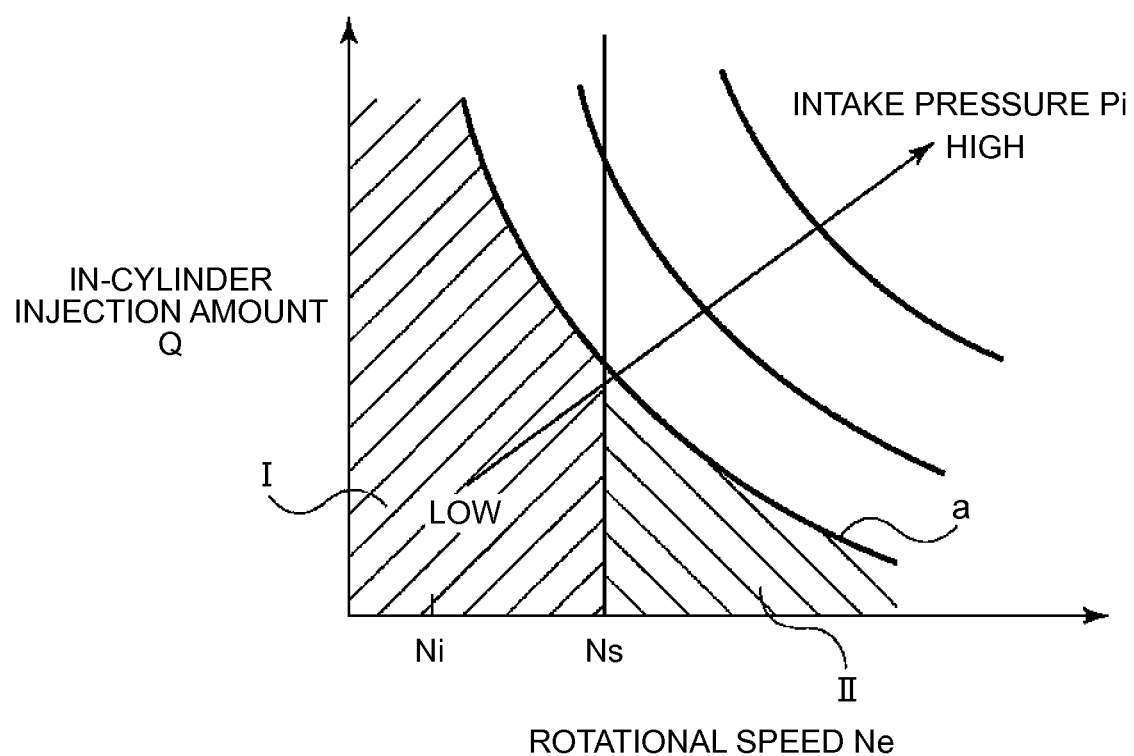
FIG. 8 shows a map representing a relationship between engine rotational speed and intake pressure, and a relationship between in-cylinder injection amount and intake pressure.

FIG. 8 shows a map representing a predetermined relationship between the engine rotational speed Ne and the intake pressure Pi, and a predetermined relationship between the in-cylinder injection amount Q and the intake air pressure Pi. The opening degree of the variable vanes is basically controlled in such a manner as to satisfy these relationships. In the drawing, Ni denotes an idle rotational speed.

As shown in the drawing, the opening degree of the variable vanes is controlled such that the intake pressure Pi rises as the engine rotational speed Ne rises or as the in-cylinder injection amount Q increases. It should be noted herein that regions I and II on the low rotation/low injection amount side with respect to a line a are non-supercharge regions where supercharge is not carried out. Besides, the region I and the region II are separated from each other by a predetermined boundary rotational speed Ns, and the region I is located on a lower rotation side than the region II.

It should be noted herein that "supercharge" refers to a state where the intake pressure Pi is higher than the atmospheric pressure, and "non-supercharge" refers to a state where the intake pressure Pi is equal to or lower than the atmospheric pressure. Accordingly, the line a represents a relationship between the engine rotational speed Ne and the in-cylinder injection amount Q at the time when the intake pressure Pi is equal to the atmospheric pressure.

The opening degree reduction control is the control of reducing the opening degree of the variable vanes when the rotational speed Ne of the engine and the in-cylinder injection amount Q are within the non-supercharge region I that is equal to or lower than the boundary rotational speed Ns. That is, if the rotational speed Ne and the in-cylinder injection amount Q are within the non-supercharge region I when step S107 of FIG. 5 is executed, the opening degree of the variable vanes is reduced by a predetermined opening degree. In particular, at this time, the opening degree of the variable vanes is reduced within such a range that the intake pressure Pi does not exceed the atmospheric pressure. In other words, after the opening degree of the variable vanes is reduced, the intake pressure Pi does not exceed the atmospheric pressure, and does not reach a state of supercharge.

In the case where it is indispensable to charge the battery with a view to, for example, ensuring minimum electric power, priority must be given to charging, so that it is not beneficial to restrict or stop the operation of the alternator 43 in the first control. Besides, under certain circumstances in which the vehicle is used, it is not always possible to restrict or stop the operation of all the auxiliaries. Accordingly, in such a case, it is preferable to increase the concentration of O2 in burner inlet gas by performing the second control instead of the first control. Alternatively, the first control may be performed by priority, and the second control may be performed in the case where the first control cannot be performed.

For example, when the engine is in operation within the non-supercharge region I close to idling, both the turbine and the compressor hardly rotate, and the compressor (more specifically, a compressor wheel) simply serves as a resistance in the intake passage. On the contrary, however, intake air rotationally drives the compressor in some cases, and the compressor increases the intake resistance.

Then, if the opening degree of the variable vanes is slightly reduced, the turbine rotational speed slightly rises, and the compressor rotational speed slightly rises as well in response to this slight rise in the turbine rotational speed. Thus, the intake resistance decreases, the engine load decreases, and the in-cylinder injection amount Q decreases. Incidentally, the engine rotational speed may increase due to the decrease in the engine load. In response to this increase in the engine rotational speed, the driver may return the accelerator pedal, the accelerator opening degree Ac may decrease, and the in-cylinder injection amount Q may decrease.

Then, the air-fuel ratio in each of the cylinders is made lean. As a result, the concentration of O2 in exhaust gas or hence burner inlet gas increases. Thus, the insufficient concentration of O2 in burner inlet gas can be ensured or compensated for, and at least a certain level of combustion performance in the burner device can be stably ensured.

In particular, what is characteristic is that the opening degree of the variable vanes is not reduced to such an extent as to raise the intake pressure Pi to the state of supercharge, in other words, that the state of non-supercharge continues to be maintained even after the opening degree of the variable vanes is reduced. This is because a rise in the intake pressure Pi to the state of supercharge leads to an increase, in the in-cylinder injection amount Q in accordance with an increase in the intake air amount Ga, and may make it impossible to increase the concentration of O2 in exhaust gas or hence burner inlet gas. In this case, the opening degree of the variable vanes is reduced only to such an extent as to reduce the intake resistance.

Next, the opening degree increase control will be described. The opening degree increase control is the control of increasing the opening degree of the variable vanes when the rotational speed Ne of the engine and the in-cylinder injection amount Q are within the non-supercharge region II higher than the boundary rotational speed Ns. That is, the opening degree of the variable vanes is increased by a predetermined opening degree if the rotational speed Ne and the in-cylinder injection amount Q are within the non-supercharge region II when step S107 of FIG. 5 is executed.

This opening degree increase control as well as the foregoing opening degree reduction control is preferably performed instead of the first control in the case where it is difficult to perform the first control.

Even in the same non-supercharge region, in the region II that is located on a higher rotation side than the region I, the amount of exhaust gas per unit time is large. Therefore, if the opening degree of the variable vanes is reduced, the back pressure applied to each of the cylinders increases, and the engine load may increase. Thus, the in-cylinder injection amount Q may increase, and the concentration of O2 in burner inlet gas may decrease.

Thus, in the case of this region II, the opening degree of the variable vanes is, on the contrary, slightly increased. Then, the back pressure falls, the pumping loss is reduced, and the engine load decreases. Thus, the in-cylinder injection amount Q decreases, so that the concentration of O2 in burner inlet gas can be increased.

By the way, the following modification examples are also conceivable in association with the opening degree increase control. First of all, the first modification example will be described. In the case of an engine having a bypass passage that bypasses the turbine 5T of the turbocharger 5 and a waste gate valve that opens/closes the bypass passage, the back pressure applied to each of the cylinders can be lowered by opening the closed waste gate valve, and the concentration of O2 in burner inlet gas can be increased. In consequence, the control of opening this waste gate valve may be performed.

Next, the second modification example will be described. If the closed exhaust shutter 12 is opened, the back pressure applied to each of the cylinders can be lowered, and the concentration of O2 in burner inlet gas can be increased. In consequence, the control of opening this exhaust shutter 12 may be performed.

As for the third modification example, if the timing for closing the exhaust valves is retarded by the variable valve timing mechanism 7, the back pressure applied to each of the cylinders can be lowered, and the concentration of O2 in burner inlet gas can be increased. In consequence, this control of retarding the timing for closing the exhaust valves may be performed.

One of these controls, namely, the variable vane opening degree increase control, the waste gate valve opening control, the exhaust shutter valve opening control, and the exhaust valve closing timing retardation control can be performed alone, or two or more of these controls can also be performed in combination.

[Third Control]

The third control as the increase control is the control of increasing/reducing the engine rotational speed Ne by increasing/reducing the in-cylinder injection amount Q during deceleration of the vehicle V. This third control will be described hereinafter in detail with reference to FIG. 9 and FIG. 10.

First of all, in order to facilitate understanding, a comparative example for the present embodiment of the invention will be described with reference to FIG. 9. The example shown in the drawing indicates a case where the automatic transmission car V as in the present embodiment of the invention has decelerated from a low-speed (e.g., about 10 to 30 km/h) cruising (constant-speed traveling) state in early phase of a warm-up process after cold start. This case corresponds to, for example, the first deceleration period at the first peak f1 in the EC mode after cold start as shown in FIG. 4.

It is assumed that the driver returns the accelerator pedal to start decelerating the vehicle (reducing the vehicle speed) at the time t1. As soon as this deceleration is started, fuel cutoff is carried out, and the in-cylinder injection amount Q is made zero. However, this fuel cutoff is carried out instantaneously or for a very short time. A recovery from fuel cutoff is made at the time t2 immediately after the start of deceleration. Then, the in-cylinder injection amount Q is increased to a predetermined injection amount Qi, which is a small amount substantially equivalent to idling, and then is held equal to the predetermined injection amount Qi.

The reason why fuel cutoff is thus instantaneously stopped and then a small amount of fuel continues to be injected from the in-cylinder injection valves 6 is to prevent engine stall. That is, in early phase of warm-up after cold start as in the present example, the oil in the torque converter T/C is hard, and the input side of the torque converter T/C tends to be dragged by the output side thereof. Accordingly, as the vehicle decelerates, the engine rotational speed Ne drops below an idling rotational speed Ni, and may cause engine stall. Thus, in order to prevent this phenomenon, a small amount of fuel is injected to rotationally drive the engine. Thus, the input side of the torque converter T/C can be rotationally driven by the engine. As indicated by (C), the engine rotational speed Ne can be held close to the idling rotational speed Ni without causing engine stall.

However, if attention is focused on the concentration of O2 in burner inlet gas, namely, the actual concentration Cr of oxygen indicated by (D), the actual concentration Cr of oxygen instantaneously becomes higher than the required concentration Ct of oxygen due to fuel cutoff, but then remains lower than the required concentration Ct of oxygen due to the subsequent injection of a small amount of fuel. In this period when the actual concentration Cr of oxygen remains lower than the required concentration Ct of oxygen, the burner device 20 cannot be turned on, which hampers early activation of the catalyst.

Figure 10:
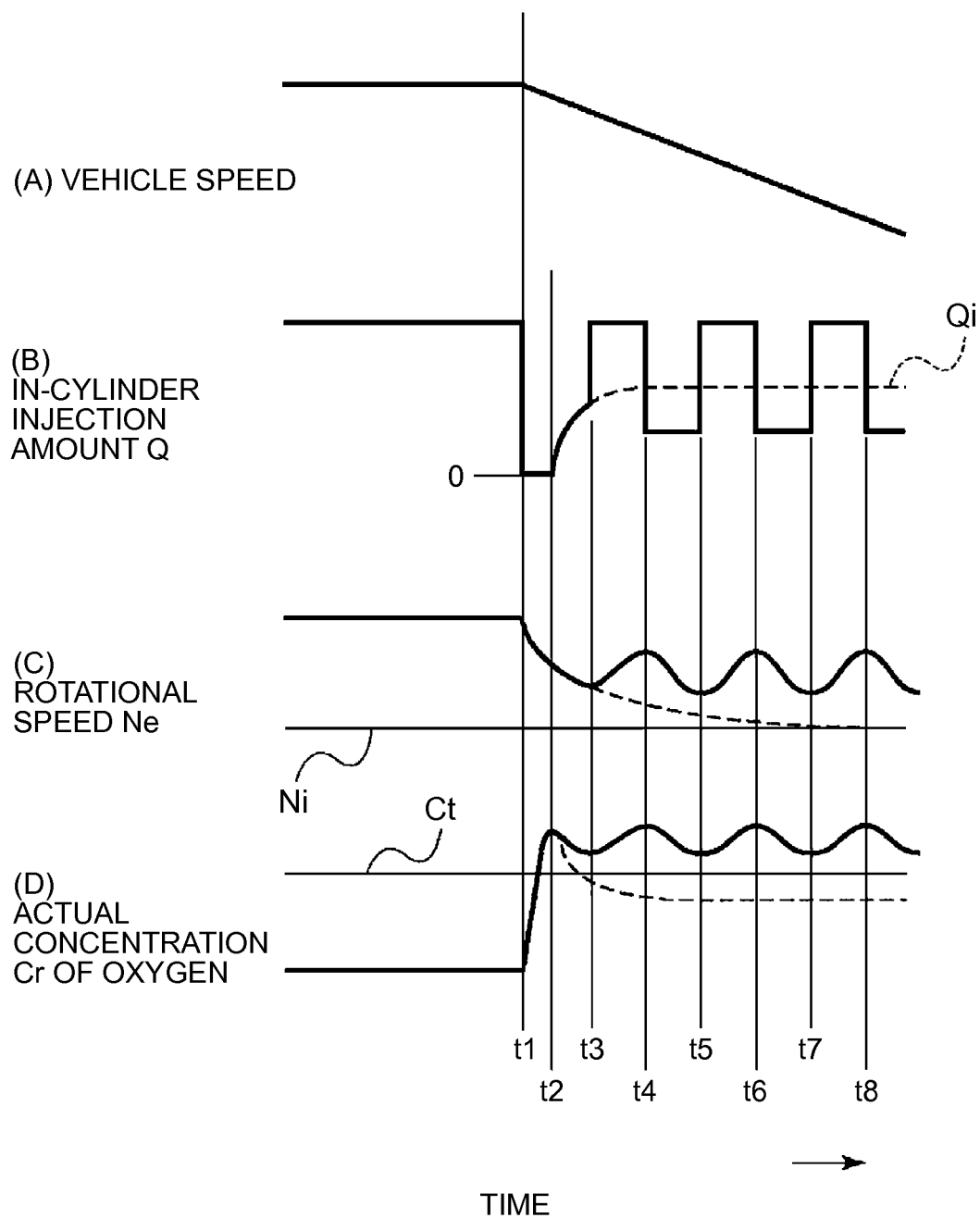
FIG. 10 is a time chart showing an example in the case where the third control is performed.

In contrast, FIG. 10 shows a case of the present embodiment of the invention. The present embodiment of the invention is different from the comparative example in fuel injection control that is performed after instantaneous fuel cutoff.

That is, after a recovery from fuel cutoff is made at the time t2, the in-cylinder injection amount Q is periodically increased/reduced substantially around the predetermined injection amount Qi, which is indicated by a broken line, as indicated by (B). Then, as a result of this, the engine rotational speed Ne is also periodically increased/reduced. In the example shown in the drawing, the in-cylinder injection amount Q is increased at the time t3, the time t5 and a time t7, and is reduced at the time t4, a time t6 and a time t8. The in-cylinder injection amount Q is increased to an equal amount at the time t3, the time t5 and the time t7, and is reduced also to an equal amount at the time t4, the time t6 and the time t8. The lengths of respective increase periods (e.g., a period between t3 and t4) are equal to one another, and the lengths of respective reduction periods (e.g., a period between t4 and t5) are also equal to one another. Incidentally, the method of increasing/reducing the in-cylinder injection amount Q is not limited to the method mentioned herein.

In this manner, as indicated by (C), the engine rotational speed Ne can be held higher than in the case of the comparative example indicated by a broken line. Then, the intake air amount Ga per unit time can be increased, and the concentration of O2 in exhaust gas or hence burner inlet gas can be increased. As indicated by (D), the actual concentration Cr of oxygen can be held higher than in the comparative example, especially higher than the required concentration Ct of oxygen. Thus, the burner device 20 can be turned on even after the recovery from fuel cutoff, and early activation of the catalyst can be promoted.

Incidentally, in the example shown in the drawing, the increase/reduction in the in-cylinder injection amount Q, the increase/reduction in the engine rotational speed Ne, and the increase/reduction in the actual concentration Cr of oxygen are in conjunction with one another. However, it is also conceivable that these changes are reversed. This is because the concentration of O2 in exhaust gas can fall if the in-cylinder injection amount Q increases, and the concentration of O2 in exhaust gas can increase if the in-cylinder injection amount Q decreases. Nonetheless, the period when the concentration of O2 in burner inlet gas is higher than in the comparative example can be reliably provided by increasing/reducing the in-cylinder injection amount Q in this manner. Then, if the actual concentration Cr of oxygen becomes higher than the required concentration Ct of oxygen in this period, the burner device 20 can be operated under favor of the timing, and its utilization can be promoted.

[Fourth Control]

Figure 11:
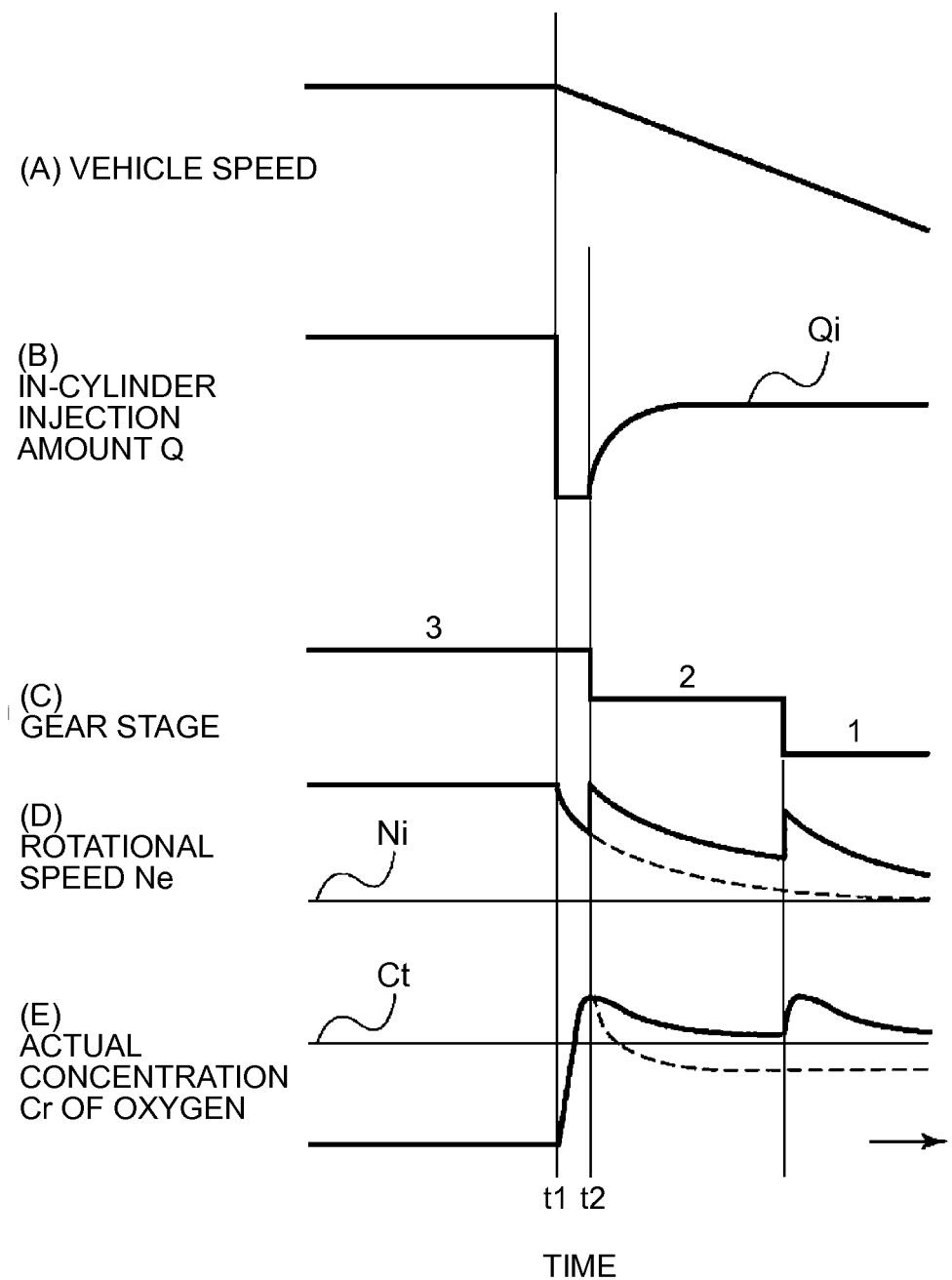
FIG. 11 is a time chart showing an example in the case where a fourth control is performed.

The fourth control as the increase control is the control of downshifting the automatic transmission T/M at a timing earlier than a prescribed shift schedule during deceleration of the vehicle V. This fourth control will be described hereinafter in detail with reference to FIG. 11.

Figure 9:
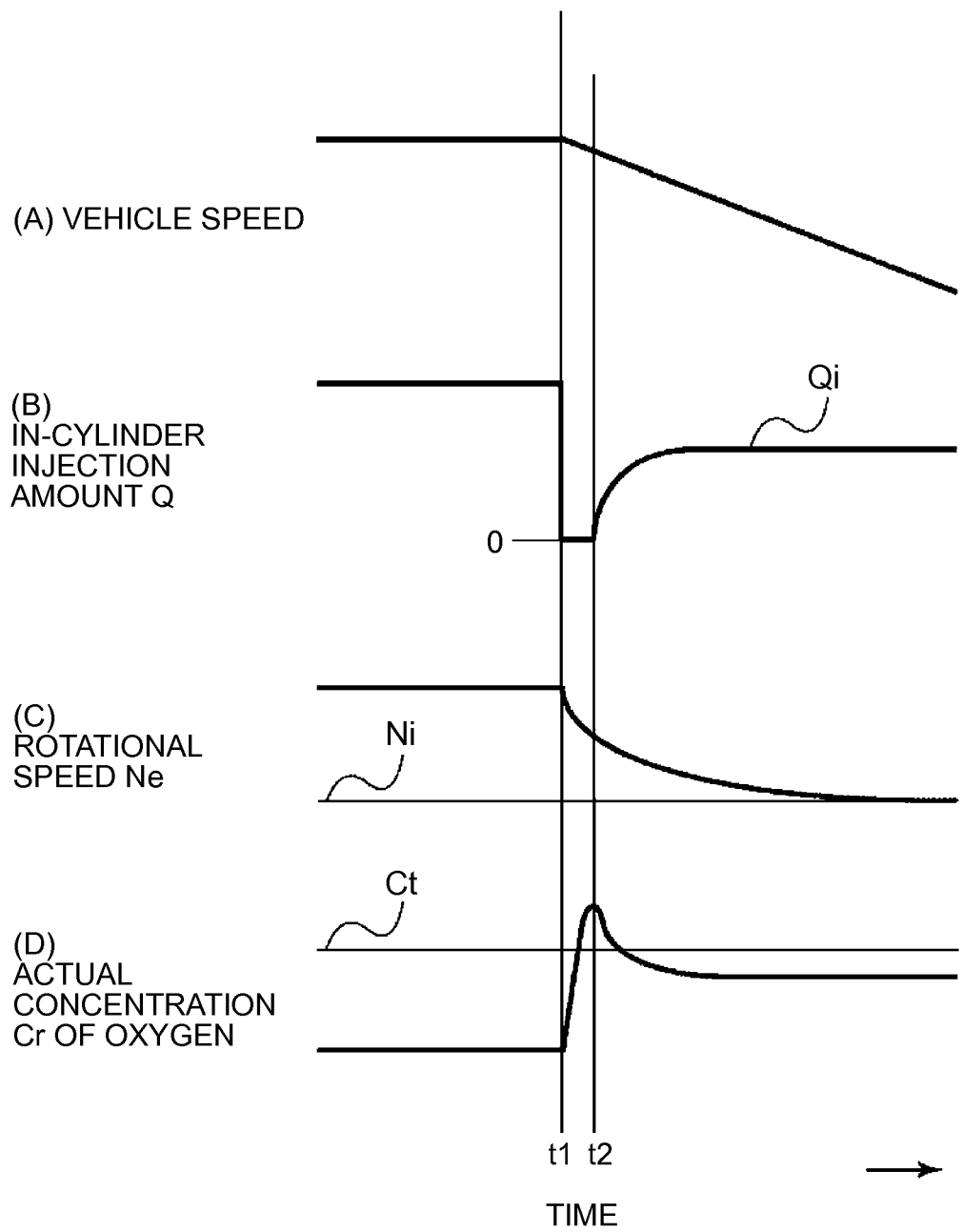
FIG. 9 is a time chart showing a comparative example in the case where a third control is not performed.

The traveling condition of the vehicle is the same as in the comparative example shown in FIG. 9. That is, in early phase of the warm-up process after cold start, the automatic transmission car V is decelerated from a low-speed (e.g., about 10 to 30 km/h) cruising state as indicated by (A).

Besides, the method of fuel injection is also the same as in the comparative example. That is, as indicated by (B), as soon as deceleration of the vehicle is started at the time t1, fuel cutoff is carried out, and the in-cylinder injection amount Q is made zero. This fuel cutoff is carried out instantaneously or only for a very short time, and a recovery from fuel cutoff is made at the time t2. Then, the in-cylinder injection amount Q is increased to the predetermined injection amount Qi, which is a small amount substantially equivalent to idling, and then is held equal to the predetermined injection amount Qi.

Besides, as indicated by (C), the gear stage that is the third speed at the time of cruising is sequentially downshifted to the second speed and the first speed during deceleration of the vehicle V. The timing for downshift in this case is a timing (on the high vehicle speed side) earlier than a prescribed or normal shift schedule except during the performance of the increase control.

During normal running of the vehicle, the automatic transmission T/M is subjected to shift control by the ECU 100, according to a prescribed shift schedule or map that uses the accelerator opening degree Ac and the vehicle speed as parameters. This prescribed shift schedule is stored in advance in the ECU 100. On the other hand, a different shift schedule exclusively for the increase control, which is based on the same parameters, is also stored in advance in the ECU 100. When the increase control is performed, the automatic transmission T/M is shifted according to this different shift schedule. This different shift schedule is set such that a downshift is made at a timing earlier than the prescribed shift schedule.

Incidentally, it is also possible to correct and use the prescribed shift schedule instead of providing this exclusive shift schedule.

In this manner, as indicated by (D), the engine rotational speed Ne during deceleration of the vehicle can be held higher than in the comparative example indicated by a broken line. Then, the intake air amount Ga per unit time can be increased, and the concentration of O2 in exhaust gas or hence burner inlet gas can be increased. As indicated by (E), the actual concentration Cr of oxygen can be held higher than in the comparative example, especially higher than the required concentration Ct of oxygen. Thus, the burner device 20 can be turned on even after a recovery from fuel cutoff, and early activation of the catalyst can be promoted.

Incidentally, two downshifts are made during deceleration of the vehicle V in the example shown in the drawing. However, the number of downshifts is arbitrary, and may be one or three or more.

[Fifth Control]

Next, the fifth control as the increase control will be described. The fifth control is applied to an engine that is equipped with a first stoppable cylinder group and a second stoppable cylinder group. Then, the fifth control is the control of stopping one of the cylinder groups as to which it is determined that the concentration of O2 in burner inlet gas is not higher than the required concentration Ct of oxygen.

Figure 12:
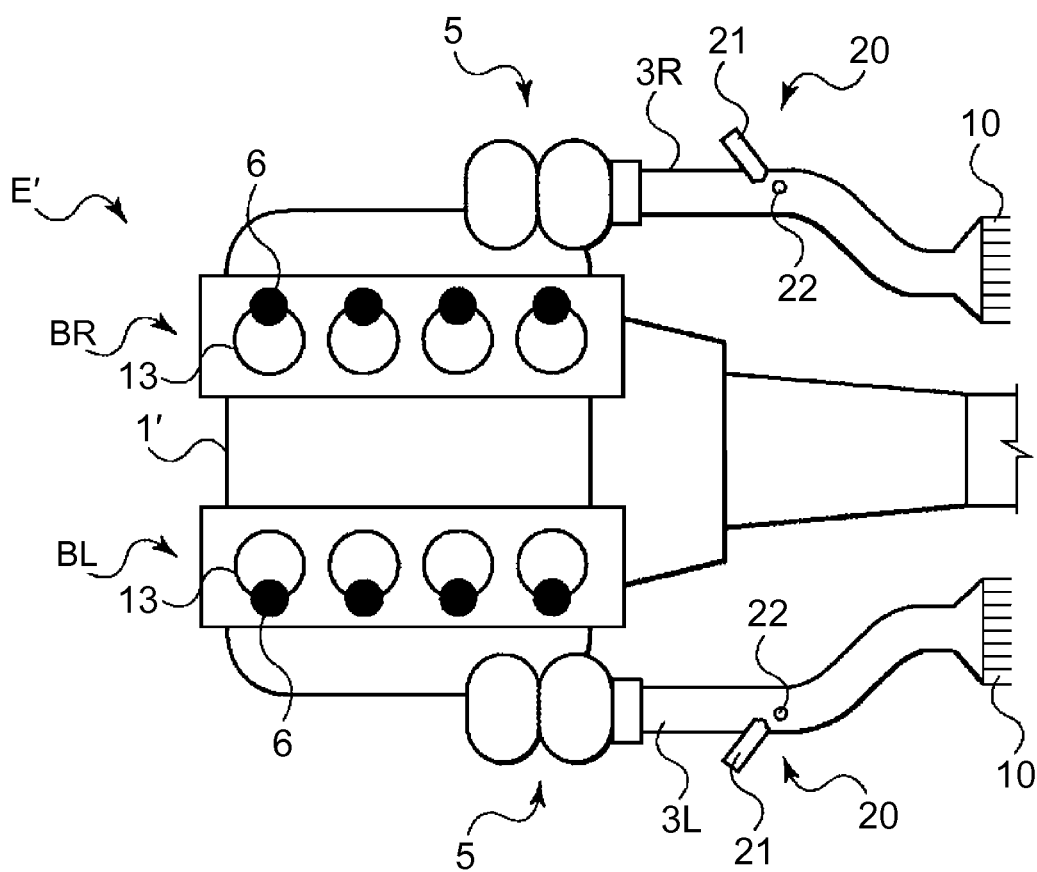
FIG. 12 is a schematic view of an internal combustion engine to which a fifth control can be applied.

FIG. 12 schematically shows an engine E' to which the fifth control can be preferably applied. It should be noted, however, that FIG. 12 shows only an essential part, and that the region not shown in the drawing is the same as that of the engine E shown in FIG. 2. In FIG. 12, components identical to those of the engine E shown in FIG. 2 are denoted by the same reference symbols respectively. The difference between the engine E' and the engine E will be mainly described hereinafter.

The engine E' shown in FIG. 12 is configured as a V-8 engine, and an engine body 1' thereof is provided with a right bank BR as a first bank and a left bank BL as a second bank. The right bank BR is provided with the first cylinder group that is made up of four cylinders 13, and the left bank BL is provided with the second cylinder group that is made up of four cylinders 13.

The first cylinder group on the right bank BR and the second cylinder group on the left bank BL can be stopped respectively as a cylinder group or a bank. This cylinder stop is controlled by the ECU 100 (not shown). For example, in the case where the first cylinder group on the right bank BR is stopped, the engine is operated on reduced cylinders only by the second cylinder group on the left bank BL.

The oxidation catalyst 10 and the burner device 20 are provided individually for each of the cylinder groups or each of the banks. That is, the turbocharger 5, the burner device 20, and the oxidation catalyst 10 are sequentially provided in series in an exhaust passage 3R that extends from the right bank BR, and the turbocharger 5, the burner device 20, and the oxidation catalyst 10 are sequentially provided in series in an exhaust passage 3L that extends from the left bank BL as well.

The ECU 100 controls the burner device 20 individually for each of the cylinder groups or each of the banks. Besides, the ECU 100 (not shown) determines, on the basis of the catalyst temperature, whether or not there is a request to operate the burner device 20, and determines whether or not the actual concentration Cr of oxygen as the concentration of O2 in burner inlet gas is higher than the required concentration Ct of oxygen, individually for each of the cylinder groups or each of the banks.

The control of the burner device 20 for each of the banks is performed in accordance with a control routine shown in FIG. 5. For example, the right bank will be described. In step S101, it is determined whether or not there is a request to operate the burner device 20 on the right bank. In this case, it is determined that there is a request for operation if the catalyst temperature of the oxidation catalyst 10 on the right bank is lower than a minimum activation temperature, and it is determined that there is no request for operation if the catalyst temperature of the oxidation catalyst 10 on the right bank is equal to or higher than the minimum activation temperature.

If it is determined that there is no request for operation, a transition to step S109 is made to turn off the burner device 20 on the right bank. On the other hand, if it is determined that there is a request for operation, the required concentration Ct of oxygen is acquired in step S102. The required concentration Ct of oxygen is acquired on the basis of the temperature Tin of burner inlet gas on the right bank.

In step S103, the actual concentration Cr of oxygen on the right bank is estimated according to the foregoing expressions (1) and (2), on the basis of the intake air amount Ga detected by the airflow meter 4 and the in-cylinder injection amount Q on the right bank. Incidentally, the intake system is common to the respective banks.

In step S104, the actual concentration Cr of oxygen on the right bank is compared with the required concentration Ct of oxygen. If it is determined that the actual concentration Cr of oxygen is higher than the required concentration Ct of oxygen, a transition to step S108 is made to turn on the burner device 20 on the right bank.

On the other hand, if it is determined that the actual concentration Cr of oxygen on the right bank is not higher than the required concentration Ct of oxygen, the increase control is performed in step S107 according to need, after the processes of steps S105 and S106.

In the case where the fifth control is performed as the increase control, the first cylinder group on the right bank BR is stopped, and the engine is operated on reduced cylinders only by the second cylinder group on the left bank BL. Thus, the in-cylinder injection amount Q is made zero for the first cylinder group on the right bank BR, and the in-cylinder injection amount Q is increased such that an equivalent engine torque can be generated, for the second cylinder group on the left bank BL.

Figure 13:
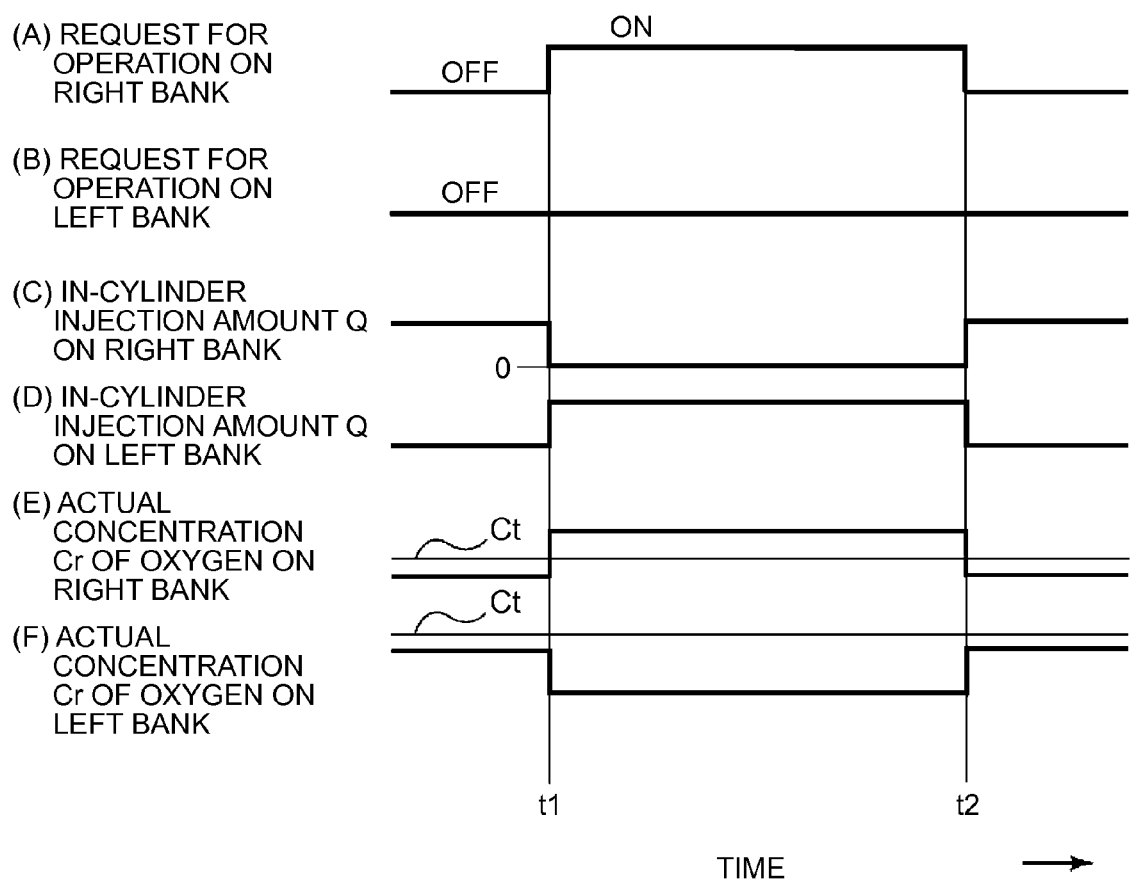
FIG. 13 is a time chart showing an example in the case where the fifth control is performed.

FIG. 13 schematically shows the situation in this case. The example shown in the drawing indicates a case where the throttle opening degree TH is equal to the full opening equivalent value THmax at the time t1 when a request to operate the burner device 20 on the right bank is made, and the fifth control is immediately started.

If the fifth control is started, the in-cylinder injection amount Q of the first cylinder group on the right bank BR is reduced to zero (see (C)), and the actual concentration Cr of oxygen on the right bank BR increases in response thereto, and becomes higher than the required concentration Ct of oxygen (see (E)). Incidentally, since the in-cylinder injection amount Q of the second cylinder group on the left bank BL is increased (see (D)), the actual concentration Cr of oxygen on the left bank BL decreases (see (F)).

Thus, on the right bank BR, the actual concentration Cr of oxygen that is higher than the required concentration Ct of oxygen can be ensured, the burner device 20 can be turned on, and activation of the oxidation catalyst 10 can be promoted.

Although the right bank has been described herein, the same control can be performed for the left bank as well.

By the way, in general, the right bank and the left bank are operated substantially on the same condition. Therefore, requests for operation may be made substantially simultaneously on the right bank and the left bank, and it may become indispensable to perform the fifth control. In this case, it is preferable to alternately carry out cylinder stop on the right bank and the left bank at intervals of a predetermined time period, turn on the burner device 20 on the stop side, and alternately and gradually raise the catalyst temperatures on both the banks.

Alternatively, it is also possible to adopt a method in which cylinder stop is carried out by priority on one of the banks where a request for operation is made first, so as to turn on the burner device 20, and cylinder stop is then carried out on the other bank where a request for operation is made later after the catalyst temperature on that one of the banks has become equal to or higher than the minimum activation temperature (i.e., after the oxidation catalyst 10 has been activated) so as to turn on the burner device 20.

This fifth control also has the following advantage. In the third control shown in FIG. 10, the in-cylinder injection amount Q is increased/reduced to make the engine rotational speed Ne higher than in the comparative example shown in FIG. 9. However, the average of this increased/reduced in-cylinder injection amount Q may become larger than the average of the in-cylinder injection amount Q in the comparative example, and a deterioration in fuel economy is incurred in this case. In contrast, according to the fifth control, although the in-cylinder injection amount Q for the cylinder group in operation increases, the in-cylinder injection amount Q for the stopped cylinder group becomes zero. It is therefore concluded that there is substantially no deterioration in fuel economy in the engine as a whole. In consequence, there is an advantage that fuel economy can be restrained from deteriorating during the performance of the control.

[Other Associated Controls]

Next, other associated controls will be described. The control apparatus according to the present embodiment of the invention can carry out a diagnosis of a malfunction in the burner device. Then in this case, it is preferable to stop the auxiliaries that are driven by the engine, when carrying out a diagnosis of a malfunction.

Figure 14:
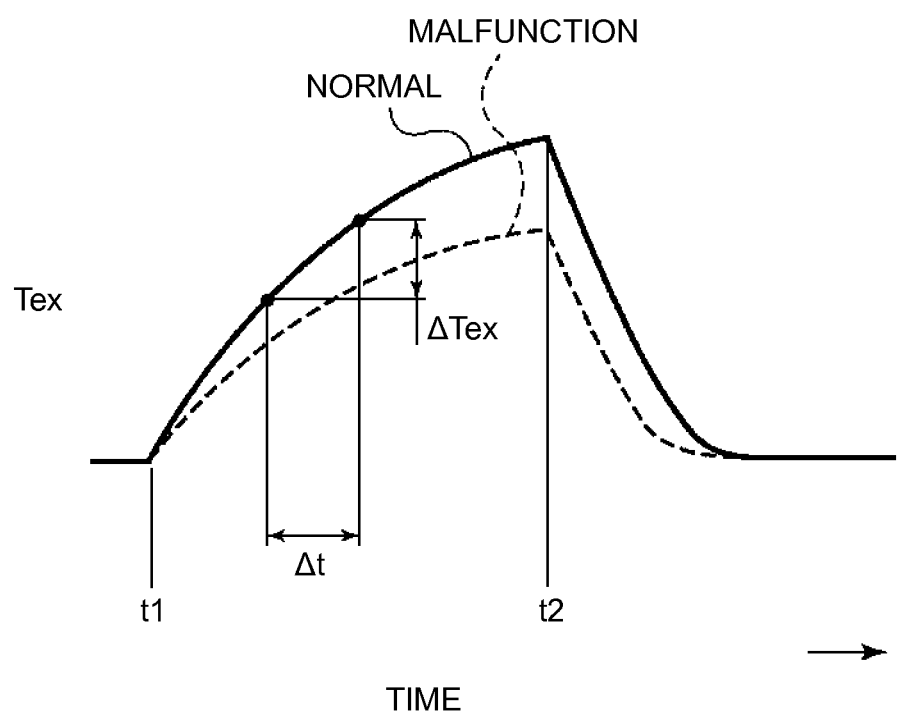
FIG. 14 is a time chart showing how the temperature of catalyst inlet gas rises during operation of the burner device.

A diagnosis of a malfunction in the burner device 20 that is applied to the engine E shown in FIG. 2 will be described hereinafter. As shown in FIG. 14, the ECU 100 obtains an amount of change $\Delta$Tex in the temperature of catalyst inlet gas on the basis of an output of the downstream exhaust gas temperature sensor 34, at a predetermined time $\Delta$t during an operation period of the burner device 20 (a period between t1 and t2). This amount of change $\Delta$Tex in the temperature of catalyst inlet gas represents a speed of change in a temperature Tex of catalyst inlet gas at the predetermined time $\Delta$t, and represents a gradient of a diagram of the temperature Tex of catalyst inlet gas as shown in the drawing.

If the burner device 20 is normal, the temperature Tex of catalyst inlet gas rises at a relatively high speed under a specific operation condition of the burner device 20, and a large value is obtained as the amount of change $\Delta$Tex in the temperature of catalyst inlet gas is obtained, as indicated by a solid line in the drawing. On the contrary, if there is a malfunction in the burner device 20, the temperature Tex of catalyst inlet gas rises only at a low speed or does not rise at all, as indicated by a broken line in the drawing. In consequence, only a small value is obtained as the amount of change $\Delta$Tex in the temperature of catalyst inlet gas.

In consequence, under favor of this characteristic, the ECU 100 compares the obtained amount of change $\Delta$Tex in the temperature of catalyst inlet gas with a predetermined malfunction criterial value, and determines that the burner device 20 is normal if the amount of change $\Delta$Tex in the temperature of catalyst inlet gas is larger than the malfunction criterial value, or determines that there is a malfunction in the burner device 20 if the amount of change $\Delta$Tex in the temperature of catalyst inlet gas is equal to or smaller than the malfunction criterial value.

Incidentally, in addition to the method in which this amount of change $\Delta$Tex in the temperature of catalyst inlet gas is utilized, it is also possible to adopt a method in which a combustion quotient of added fuel in the burner device 20 is calculated, and a determination on normality/malfunction is made depending on whether this combustion quotient is large or small. This is because there is a correlation between the combustion quotient and the amount of change $\Delta$Tex in the temperature of catalyst inlet gas.

By the way, if at least one of the A/C compressor 41 and the alternator 43 as the auxiliaries is in operation during this diagnosis of the malfunction, especially during the predetermined time $\Delta$t in which the amount of change $\Delta$Tex in the temperature of catalyst inlet gas is acquired, the following problem is caused. That is, the operation states of these auxiliaries can change. For example, the amount of the cooling medium discharged from the A/C compressor 41 changes in accordance with the request to operate the air-conditioner, and the amount of the electric power generated by the alternator 43 changes in accordance with the battery charge amount or the like.

Thus, the engine load may change in accordance with the changes in the operation states of the auxiliaries, and the concentration of O2 in burner inlet gas may change. Then, even if the burner device 20 is operated under a certain condition, the combustion quotient of added fuel may change, and it may become impossible to obtain the suitable amount of change ΔTex in the temperature of catalyst inlet gas matching an operation condition. Besides, the concentration of O2 in burner inlet gas may also become unstable, and the concentration of O2 in burner inlet gas may further fall in the aforementioned region where the concentration of O2 in burner inlet gas is originally low, so that sufficient combustion may not be accomplished. As a result, the reliability of the diagnosis of the malfunction falls, and there is also a possibility of an erroneous diagnosis being made on the assumption that there is a malfunction when the burner device 20 is intrinsically normal.

Thus, in the present embodiment of the invention, the auxiliaries are stopped during the diagnosis of the malfunction, especially during the predetermined time Δt in which the amount of change ΔTex in the temperature of catalyst inlet gas is acquired. More specifically, both the A/C compressor 41 and the alternator 43 are stopped.

Thus, the engine load and hence the concentration of O2 in burner inlet gas can be prevented from changing as a result of changes in the operation states of the auxiliaries. Then, the suitable amount of change ΔTex in the temperature of catalyst inlet gas matching the operation condition of the burner device 20 can be obtained, thus making it possible to enhance the reliability of the diagnosis of the malfunction and prevent an erroneous diagnosis from being made.

Although the preferred embodiment of the invention has been described above, other various embodiments of the invention are conceivable. For example, the invention can also be applied to a spark ignition internal combustion engine, namely, a gasoline engine, and in particular, can also be preferably applied to a lean-burn gasoline engine that is operated at an air-fuel ratio leaner than the stoichiometric air-fuel ratio. Besides, the method of fuel injection is not limited to direct injection, but may be port injection for injecting fuel into an intake port. The respective components of the aforementioned embodiment of the invention can be combined with one another wherever possible.

The invention claimed is:

1. A control apparatus for an internal combustion engine that is equipped with an exhaust gas treatment device that is provided in an exhaust passage, and a burner device that is provided in the exhaust passage upstream of the exhaust gas treatment device so as to raise a temperature of exhaust gas supplied to the exhaust gas treatment device, and an oxygen concentration sensor, the control apparatus comprising:

an electronic control unit including a computer that performs calculation processes to control the engine, and a ROM and RAM for storing programs, data, and calculation results for the computer, and at least one port for inputting and outputting signals to and from the engine, the electronic control unit configured to:

restrict operation of an auxiliary that is driven by the internal combustion engine in order to increase a concentration of oxygen in exhaust gas supplied to the burner device when the concentration of oxygen in exhaust gas supplied to the burner device is not higher than a predetermined required concentration of oxygen and there is a request to operate the burner device.

2. The control apparatus for the internal combustion engine according to claim 1, wherein the electronic control unit is configured to stop operation of the auxiliary in order to increase the concentration of oxygen in exhaust gas supplied to the burner device when the concentration of oxygen in exhaust gas supplied to the burner device is not higher than the predetermined required concentration of oxygen and there is the request to operate the burner device.

3. The control apparatus for the internal combustion engine according to claim 1, wherein the internal combustion engine is equipped with a turbocharger that is provided in the exhaust passage upstream of the burner device, the turbocharger has a variable vane that is provided at an inlet portion of a turbine, and the electronic control unit configured to change an opening degree of the variable vane.

4. The control apparatus for the internal combustion engine according to claim 3, wherein the electronic control unit reduces the opening degree of the variable vane when an operating state of the internal combustion engine is within a predetermined non-supercharge region and an engine rotational speed is equal to or lower than a predetermined rotational speed.

5. The control apparatus for the internal combustion engine according to claim 4, wherein the electronic control unit reduces the opening degree of the variable vane within such a range that an intake pressure does not exceed an atmospheric pressure.

6. The control apparatus for the internal combustion engine according to claim 3, wherein the electronic control unit increases the opening degree of the variable vane when an operating state of the internal combustion engine is within a predetermined non-supercharge region and an engine rotational speed is higher than a predetermined rotational speed.

7. The control apparatus for the internal combustion engine according to claim 1, wherein the internal combustion engine is mounted on a vehicle, the vehicle has an automatic transmission that is coupled to the internal combustion engine via a torque converter, and the electronic control unit increases or reduces an engine rotational speed by increasing/reducing an amount of fuel supplied into a cylinder during deceleration of the vehicle.

8. The control apparatus for the internal combustion engine according to claim 1, wherein the internal combustion engine is mounted on a vehicle, the vehicle has an automatic transmission that is coupled to the internal combustion engine via a torque converter, and the electronic control unit downshifts the automatic transmission at a timing earlier than a prescribed shift schedule during deceleration of the vehicle.

9. The control apparatus for the internal combustion engine according to claim 1, wherein the internal combustion engine is equipped with a first stoppable cylinder group, a second stoppable cylinder group, and the exhaust gas treatment device and the burner device that are provided individually for each of the cylinder groups, the electronic control unit is configured to determine, for each of the cylinder groups, whether or not there is a request to operate the burner device and whether or not the concentration of oxygen in exhaust gas supplied to the burner device is higher than the required concentration of oxygen, and the electronic control unit configured to stop one of the cylinder groups as to which it is determined that the concentration of oxygen in exhaust gas supplied to the burner device is not higher than the required concentration of oxygen.

10. The control apparatus for the internal combustion engine according to claim 1, wherein the electronic control unit is configured to carry out a diagnosis of a malfunction in the burner device during operation of the burner device, and stop the auxiliary that is driven by the internal combustion engine, at a time of the diagnosis of the malfunction.

11. The control apparatus for the internal combustion engine according to claim 1, wherein the electronic control unit is configured to increase an opening degree of a throttle valve that is provided in an intake passage, before performing the increase control, when it is determined that the concentration of oxygen in exhaust gas supplied to the burner device is not higher than the required concentration of oxygen, and the electronic control unit is configured to perform the increase control when the concentration of oxygen in exhaust gas supplied to the burner device is not higher than the required concentration of oxygen even when the opening degree of the throttle valve is increased to a maximum opening degree.

12. A control apparatus for an internal combustion engine that is equipped with an exhaust gas treatment device that is provided in an exhaust passage, and a burner device that is provided in the exhaust passage upstream of the exhaust gas treatment device so as to raise a temperature of exhaust gas supplied to the exhaust gas treatment device, and an oxygen concentration sensor, the control apparatus comprising:

an electronic control unit including a computer that performs calculation processes to control the engine, and a ROM and RAM for storing programs, data, and calculation results for the computer, and at least one port for inputting and outputting signals to and from the engine, the electronic control unit configured to:

restrict operation of an auxiliary that is driven by the internal combustion engine in order to increase a concentration of oxygen in exhaust gas supplied to the burner device when fuel is supplied into a cylinder of the engine and an opening degree of a throttle valve that is provided in an intake passage of the engine is a value equivalent to full opening when the burner device is operated.

* * * * *